(12) United States Patent
Kimura

(10) Patent No.: US 7,589,908 B2
(45) Date of Patent: Sep. 15, 2009

(54) ZOOM LENS AND IMAGE PICKUP APPARATUS HAVING THE SAME

(75) Inventor: Tomonori Kimura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/324,131

(22) Filed: Nov. 26, 2008

(65) Prior Publication Data

US 2009/0168196 A1 Jul. 2, 2009

(30) Foreign Application Priority Data

Dec. 28, 2007 (JP) ............................. 2007-340138

(51) Int. Cl.
G02B 15/14 (2006.01)
(52) U.S. Cl. .................. 359/687; 359/683; 359/685; 359/715; 359/740; 359/774
(58) Field of Classification Search ................ 359/683, 359/685–687, 715, 740, 774
See application file for complete search history.

(56) References Cited

U.S. PATENT DOCUMENTS

| 5,963,378 | A | 10/1999 | Tochigi | |
|---|---|---|---|---|
| 6,473,231 | B2 * | 10/2002 | Hamano et al. | ............. 359/557 |
| 6,606,202 | B2 | 8/2003 | Hoshi | |
| 7,031,072 | B2 * | 4/2006 | Hoshi | .......................... 359/687 |
| 7,057,828 | B2 * | 6/2006 | Horiuchi | ..................... 359/687 |
| 7,133,214 | B2 * | 11/2006 | Hoshi | .......................... 359/687 |
| 7,199,940 | B2 | 4/2007 | Obama | |
| 7,199,942 | B2 * | 4/2007 | Miyazawa | ................... 359/687 |
| 7,218,456 | B2 | 5/2007 | Obama | |
| 7,277,234 | B2 * | 10/2007 | Hoshi | .......................... 359/687 |
| 7,336,425 | B2 | 2/2008 | Obama | |
| 7,381,102 | B2 | 6/2008 | Camacho | |
| 2002/0063961 | A1 * | 5/2002 | Hamano et al. | ............. 359/557 |
| 2006/0146417 | A1 | 7/2006 | Hoshi | |
| 2007/0279764 | A1 * | 12/2007 | Hoshi | .......................... 359/687 |

FOREIGN PATENT DOCUMENTS

| JP | 7-270684 | 10/1995 |
|---|---|---|
| JP | 8-94931 | 4/1996 |
| JP | 2003-050351 | 2/2003 |
| JP | 2006-84740 | 3/2006 |
| JP | 2006-189627 | 7/2006 |
| JP | 2006-301193 | 11/2006 |

* cited by examiner

*Primary Examiner*—Evelyn A. Lester
(74) *Attorney, Agent, or Firm*—Canon USA Inc IP Div

(57) ABSTRACT

A zoom lens includes, in order from an object side to an image side, a first lens unit having a positive refractive power, a second lens unit having a negative refractive power, a third lens unit having a positive refractive power, and a rear lens unit including one or more lens units and having an overall positive refractive power. In the zoom lens, the third lens unit includes a first subunit having a positive refractive power and including one lens component having a positive refractive power, an aperture stop, and a second subunit including a negative lens. In the third lens unit of the zoom lens, a focal length of each of the first subunit and the second subunit is appropriately set.

16 Claims, 34 Drawing Sheets

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same. More specifically, the present invention relates to a zoom lens suitable to an image pickup apparatus using a solid-state image sensor, such as a video camera, a digital still camera, a broadcast camera, or a monitoring camera, or to an image pickup apparatus using silver-halide film.

2. Description of the Related Art

In recent years, an image pickup apparatus using a solid-state image sensor, such as a video camera, a digital still camera, a broadcast camera, or a monitoring camera, has multiple functions. Furthermore, the size of such an image pickup apparatus is small.

In addition, it is desired by the market that a photographic optical system used in an image pickup apparatus has a short total lens length, a compact (small) size, and a high zoom ratio (high variable magnification ratio), and that a zoom lens has a high resolution.

A positive-lead type zoom lens in which a lens unit having a positive refractive power is located on the object side is widely used to respond to the desire. For example, a zoom lens is widely used that includes a first lens unit having a positive refractive power, a second lens unit having a negative refractive power, a third lens unit having a positive refractive power, and a rear lens unit including one or more lens units, which is located following the third lens unit.

In such a zoom lens, the second lens unit having a negative refractive power implements a main variable magnification by moving towards the image side during zooming from the wide-angle end to the telephoto end. Moreover, in such a zoom lens, the lens configuration of the third lens unit is significant in achieving high optical performance for the entire zoom range.

In a zoom lens discussed in U.S. Pat. No. 5,963,378, a third lens unit includes one or more positive lenses and negative lenses. Furthermore, an aperture stop is located just in front of the third lens unit.

In zoomlenses discussed in U.S. Pat. No. 6,606,202, Japanese Patent Application Laid-Open No. 08-94931, U.S. Pat. No. 7,199,942, and U.S. Patent Application Publication No. US 2006/0146417 A1, a third lens unit includes three lenses and an aperture stop is located between the lenses of the third lens unit to achieve high optical performance for the entire zooms area.

Furthermore, in a zoom lens discussed in U.S. Patent Application Publication No. 2006/0146417 A1, a third lens unit can be moved in a direction having a component perpendicular (orthogonal) to an optical axis to correct an image shake in a captured image occurring when the zoom lens is vibrated.

In a zoom lens discussed in U.S. Pat. No. 7,199,940, a part of the lenses constituting a third lens unit can be moved in a direction perpendicular to an optical axis to correct an image shake occurring when the zoom lens is vibrated.

In recent years, it is strongly desired by the market that a zoom lens used in an image pickup apparatus has a high zoom ratio and has a lens system whose total size is small.

Generally, in a zoom lens, if the refractive power of each lens unit is intensified, then the moving amount for moving each lens unit for obtaining a predetermined zoom ratio can be reduced. Accordingly, if each lens unit has a high refractive power, a high zoom ratio can be achieved and the total lens length can be shortened.

However, an assembling accuracy for each lens unit may be degraded when the refractive power of each lens unit is merely intensified. For example, in the above-described conventional zoom lens, if the optical axis of each lens in the third lens unit becomes relatively offset during assembling of the third lens unit, which may greatly affect the optical performance of the zoom lens, an image performance may degrade.

Accordingly, in the above-described positive-lead type zoom lens, it is highly important to appropriately set the lens configuration of a third lens unit to achieve a small-size zoom lens having high optical performance.

Furthermore, with respect to a digital camera or a video camera, it is desired that a high optical performance can be achieved even if the camera is vibrated.

SUMMARY OF THE INVENTION

The present invention is directed to a zoom lens whose total lens length is small, whose amount of optical performance degradation occurring due to a manufacturing error, such as a relative offset of an optical axis of each lens, is small, which can suppress to a minimum the degradation of the optical performance occurring due to decentration aberration during image-shake correction, and which can achieve a high image quality.

According to an aspect of the present invention, a zoom lens includes, in order from an object side to an image side, a first lens unit having a positive refractive power, a second lens unit having a negative refractive power, a third lens unit having a positive refractive power, and a rear lens unit including one or more lens units and having an overall positive refractive power. In the zoom lens, intervals between adjacent ones of the first lens unit, the second lens unit, the third lens unit, and the rear lens unit are variable and the second lens unit is movable towards the image side during zooming from a wide-angle end to a telephoto end. The third lens unit is movable in a direction having a component perpendicular to an optical axis to displace an image position. The third lens unit includes, in order from the object side to the image side, a first subunit having a positive refractive power, an aperture stop, and a second subunit. The first subunit includes one lens component having a positive refractive power. The second subunit includes a negative lens. A focal length of the first subunit (f3a) and a focal length of the second subunit (f3b) satisfy the following condition:

$$-0.1 < f3a/f3b < 0.1.$$

According to another aspect of the present invention, an image pickup apparatus includes a zoom lens and a solid-state image sensor configured to receive an image formed by the zoom lens. In the image pickup apparatus, the zoom lens includes, in order from an object side to an image side, a first lens unit having a positive refractive power, a second lens unit having a negative refractive power, a third lens unit having a positive refractive power, and a rear lens unit including one or more lens units and having an overall positive refractive power. Intervals between adjacent ones of the first lens unit, the second lens unit, the third lens unit, and the rear lens unit are variable and the second lens unit is movable towards the image side during zooming from a wide-angle end to a telephoto end. The third lens unit is movable in a direction having a component perpendicular to an optical axis to displace an image position. The third lens unit includes, in order from the object side to the image side, a first subunit having a positive refractive power, an aperture stop, and a second subunit. The first subunit includes one lens component having a positive refractive power. The second subunit includes a negative lens. A focal length of the first subunit (f3*a*) and a focal length of the second subunit (f3*b*) satisfy the following condition:

−0.1<*f*3*a*/*f*3*b*<0.1.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

DETAILED DESCRIPTION OF THE EMBODIMENTS

Figure 1:
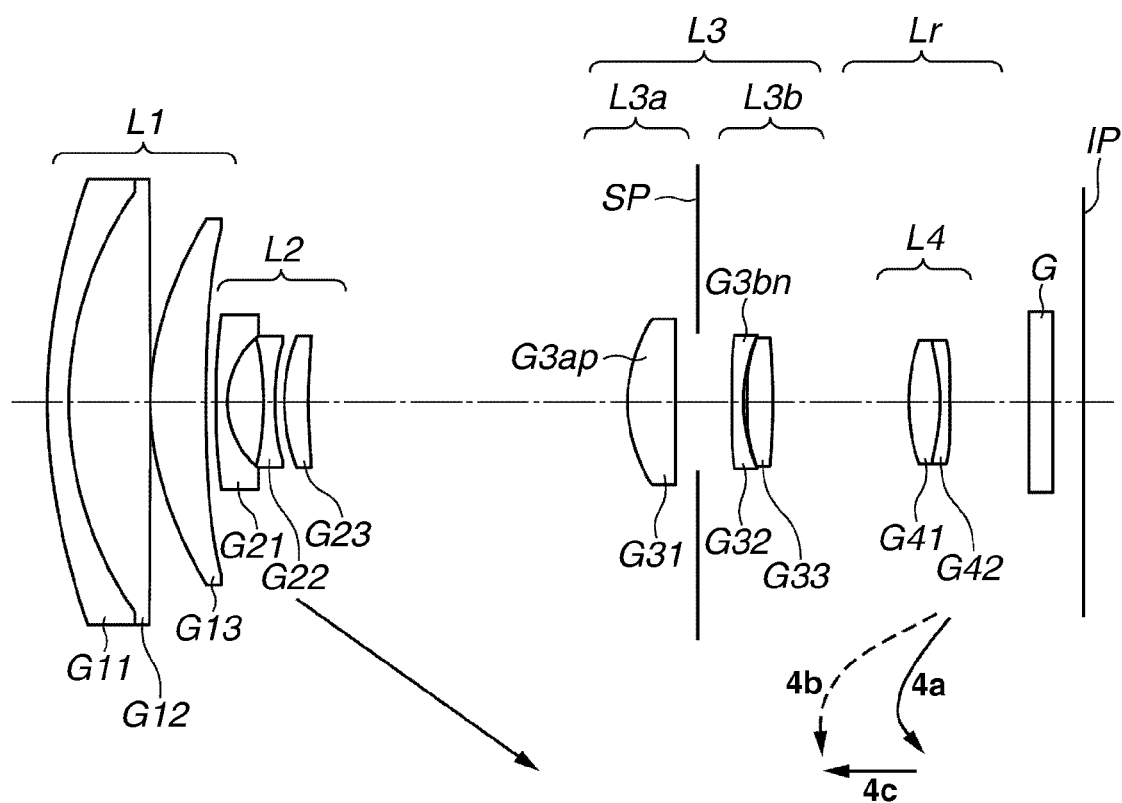
FIG. 1 is a cross section of a zoom lens at the wide-angle end according to a first exemplary embodiment of the present invention.

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended A zoom lens according to an exemplary embodiment of the present invention includes, in order from the object side to the image side, a first lens unit having a positive refractive power, a second lens unit having a negative refractive power, a third lens unit having a positive refractive power, and a rear lens unit including one or more lens units and having an overall positive refractive power.

Intervals between adjacent ones of the first lens unit, the second lens unit, the third lens unit, and the rear lens unit are variable and the second lens unit is movable towards the image side during zooming from the wide-angle end to the telephoto end.

Furthermore, the third lens unit is movable in a direction having a component perpendicular to the optical axis (in a direction perpendicular to the optical axis in an exemplary embodiment) to displace an image position (to implement an image stabilization).

Figure 2:
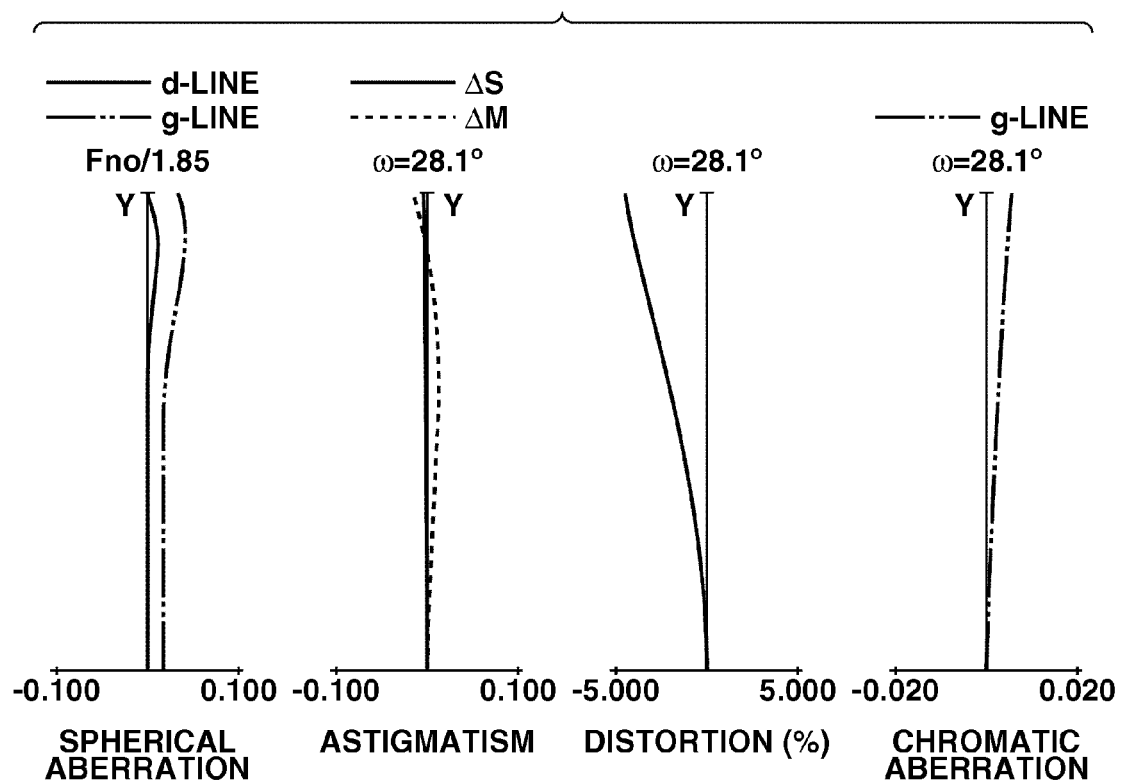
FIG. 2 is an aberration chart for the zoom lens at the wide-angle end according to the first exemplary embodiment of the present invention.
Figure 3:
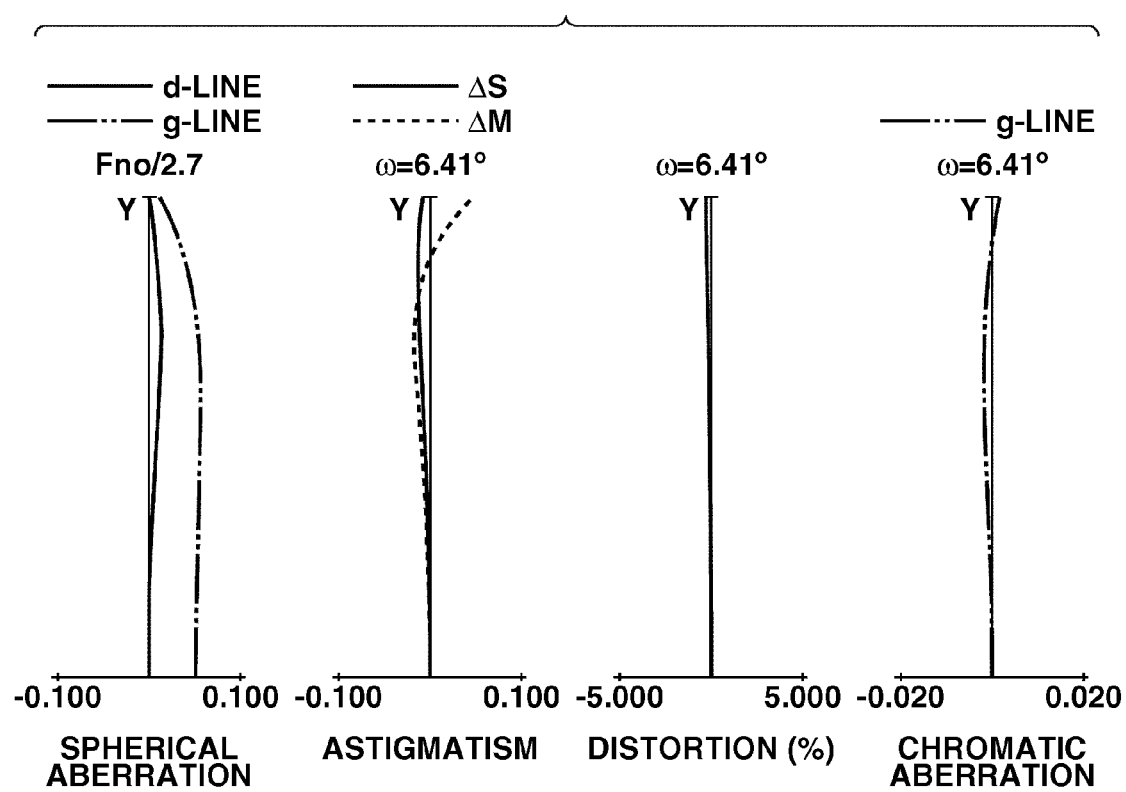
FIG. 3 is an aberration chart for the zoom lens at a middle zoom position according to the first exemplary embodiment of the present invention.
Figure 4:
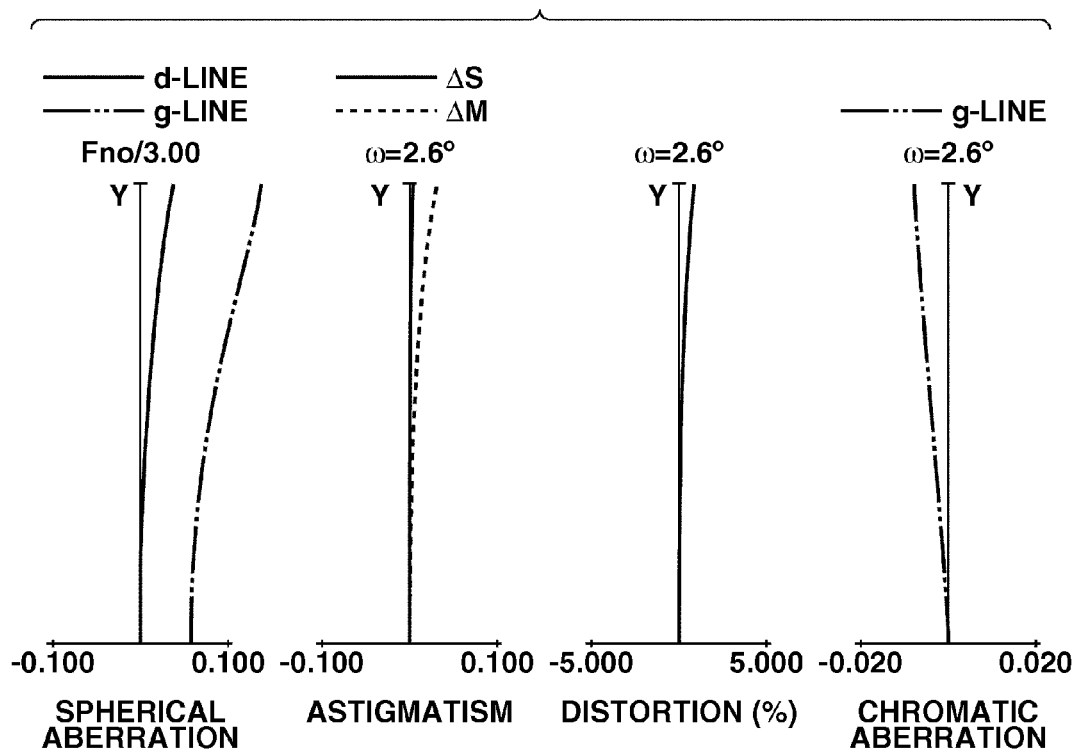
FIG. 4 is an aberration chart for the zoom lens at the telephoto end according to the first exemplary embodiment of the present invention.

FIG. 1 is a cross section illustrating an exemplary lens configuration of the zoom lens according to a first exemplary embodiment of the present invention. FIG. 2 is an aberration chart for the zoom lens at the wide-angle end (short focal length end) according to the first exemplary embodiment of the present invention. FIG. 3 is an aberration chart for the zoom lens at a middle zoom position according to the first exemplary embodiment of the present invention. FIG. 4 is an aberration chart for the zoom lens at the telephoto end (long focal length end) according to the first exemplary embodiment of the present invention.

Figure 5:
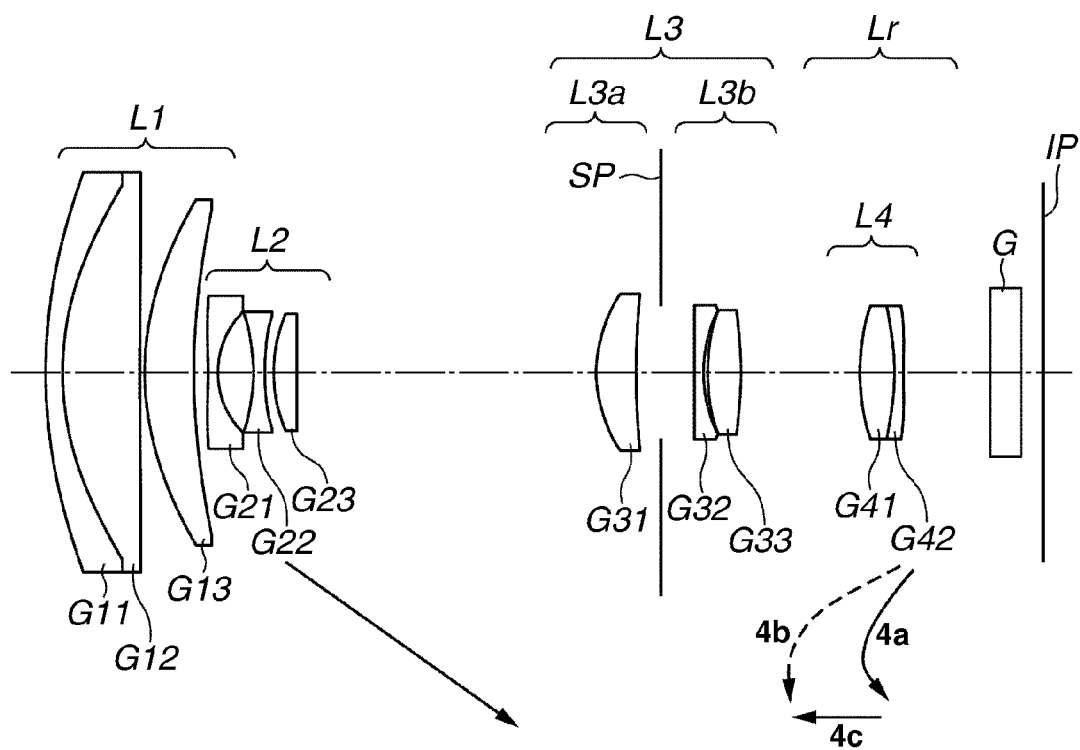
FIG. 5 is a lens cross section for a zoom lens at the wide-angle end according to a second exemplary embodiment of the present invention.
Figure 6:
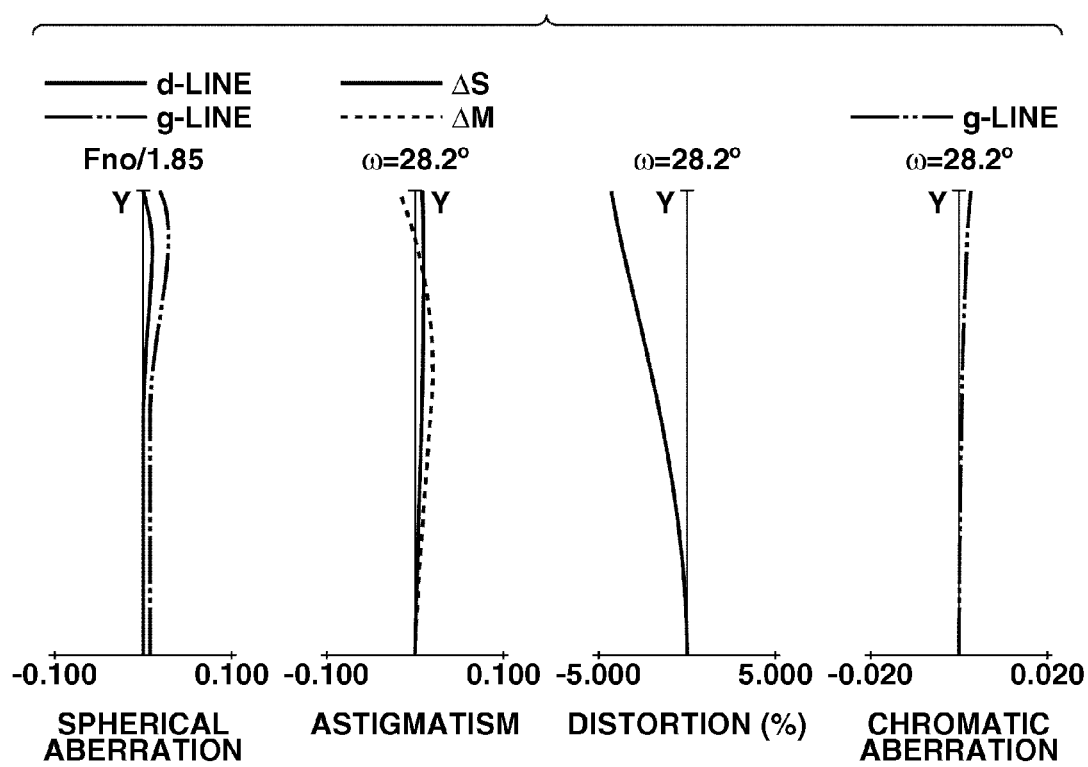
FIG. 6 is an aberration chart for the zoom lens at the wide-angle end according to the second exemplary embodiment of the present invention.
Figure 7:
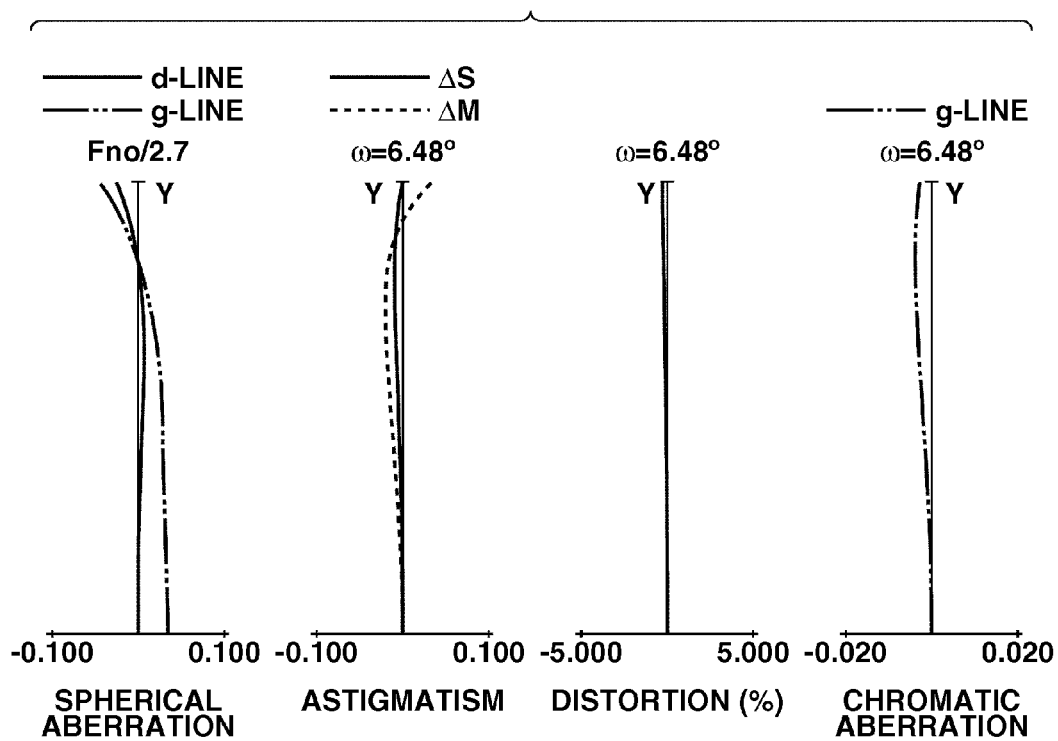
FIG. 7 is an aberration chart for the zoom lens at a middle zoom position according to the second exemplary embodiment of the present invention.
Figure 8:
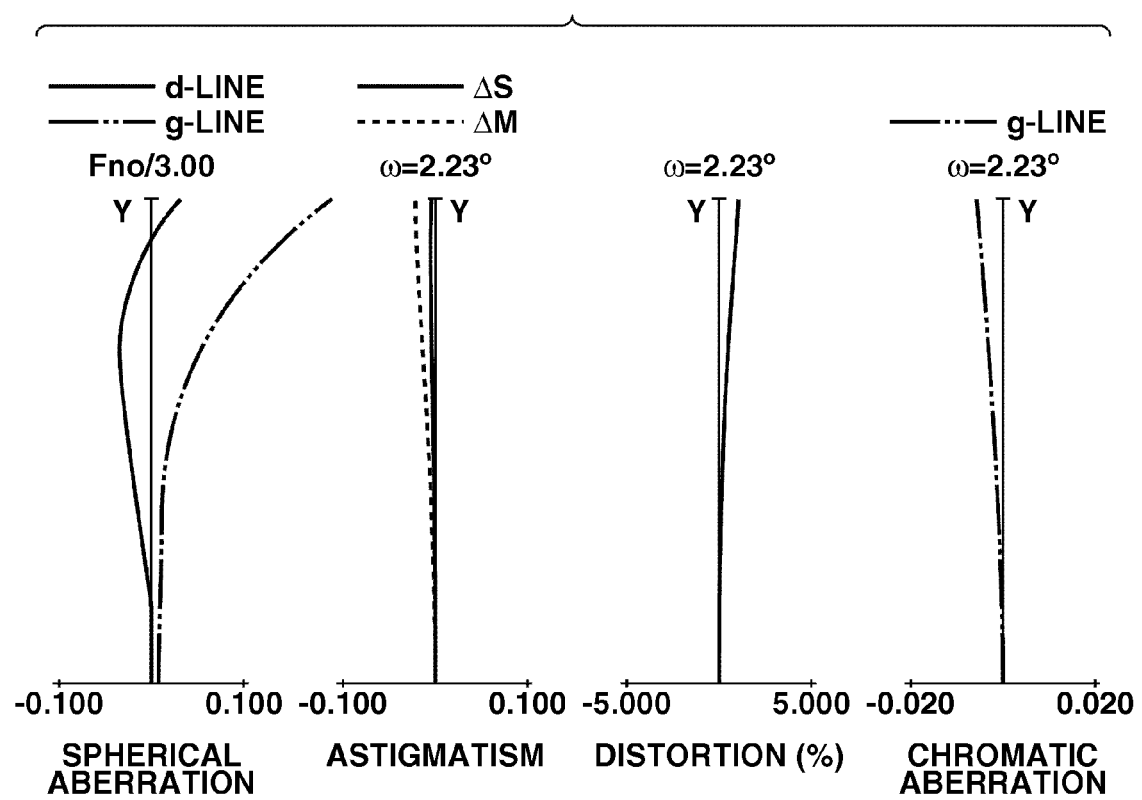
FIG. 8 is an aberration chart for the zoom lens at the telephoto end according to the second exemplary embodiment of the present invention.

FIG. 5 is a cross section illustrating an exemplary lens configuration of a zoom lens according to a second exemplary embodiment of the present invention. FIG. 6 is an aberration chart for the zoom lens at the wide-angle end according to the second exemplary embodiment of the present invention. FIG. 7 is an aberration chart for the zoom lens at a middle zoom position according to the second exemplary embodiment of the present invention. FIG. 8 is an aberration chart for the zoom lens at the telephoto end according to the second exemplary embodiment of the present invention.

Figure 9:
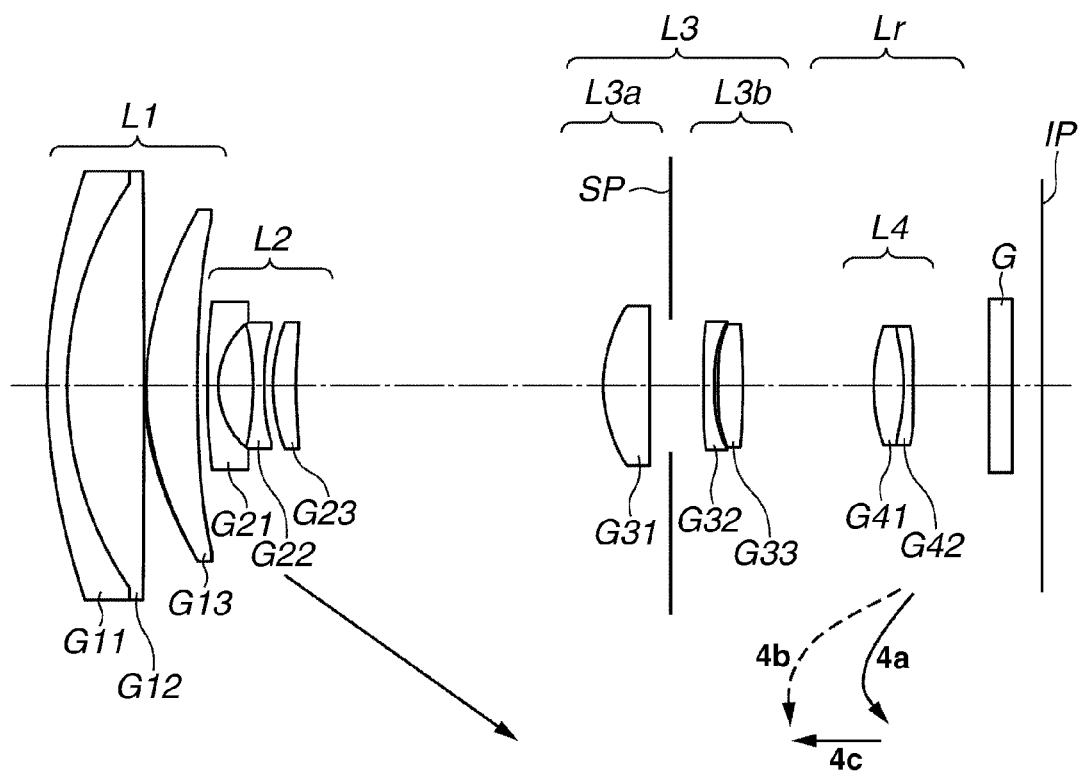
FIG. 9 is a lens cross section of a zoom lens at the wide-angle end according to a third exemplary embodiment of the present invention.
Figure 10:
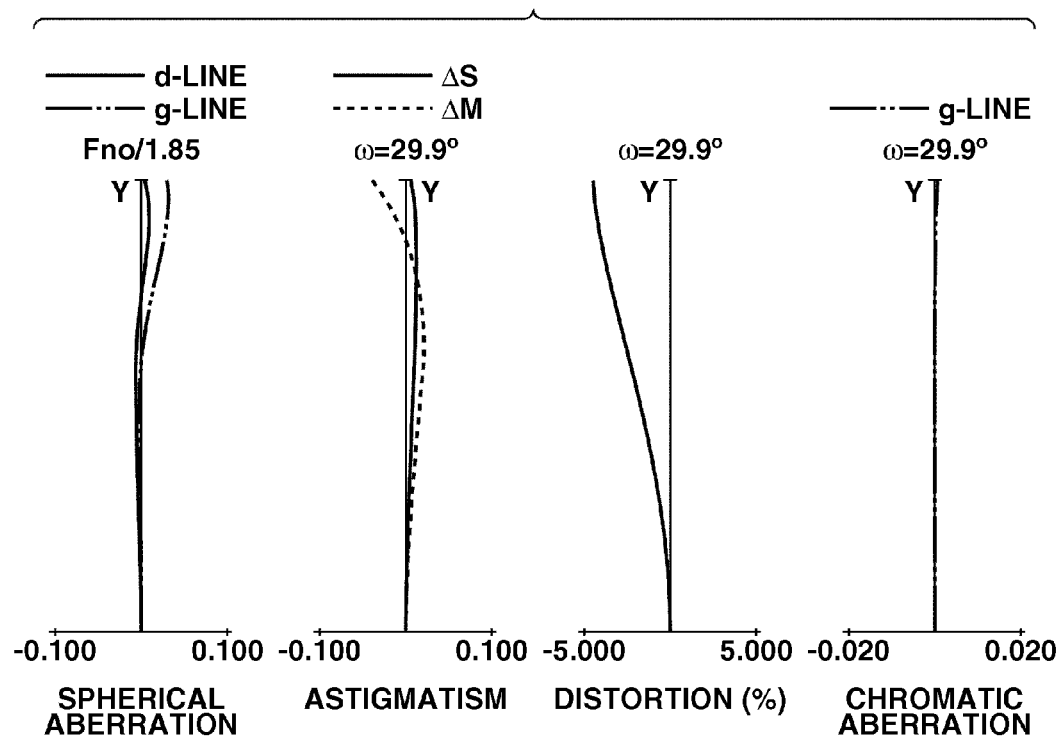
FIG. 10 is an aberration chart for the zoom lens at the wide-angle end according to the third exemplary embodiment of the present invention.
Figure 11:
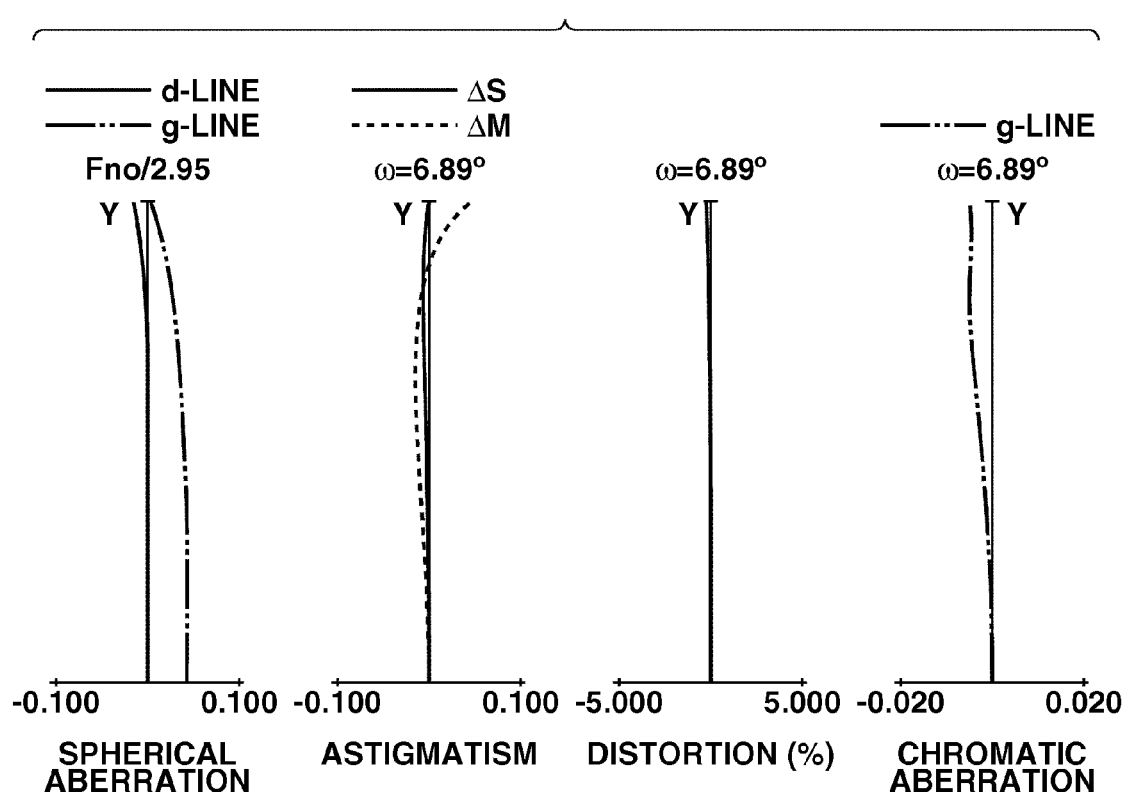
FIG. 11 is an aberration chart for the zoom lens at a middle zoom position according to the third exemplary embodiment of the present invention.
Figure 12:
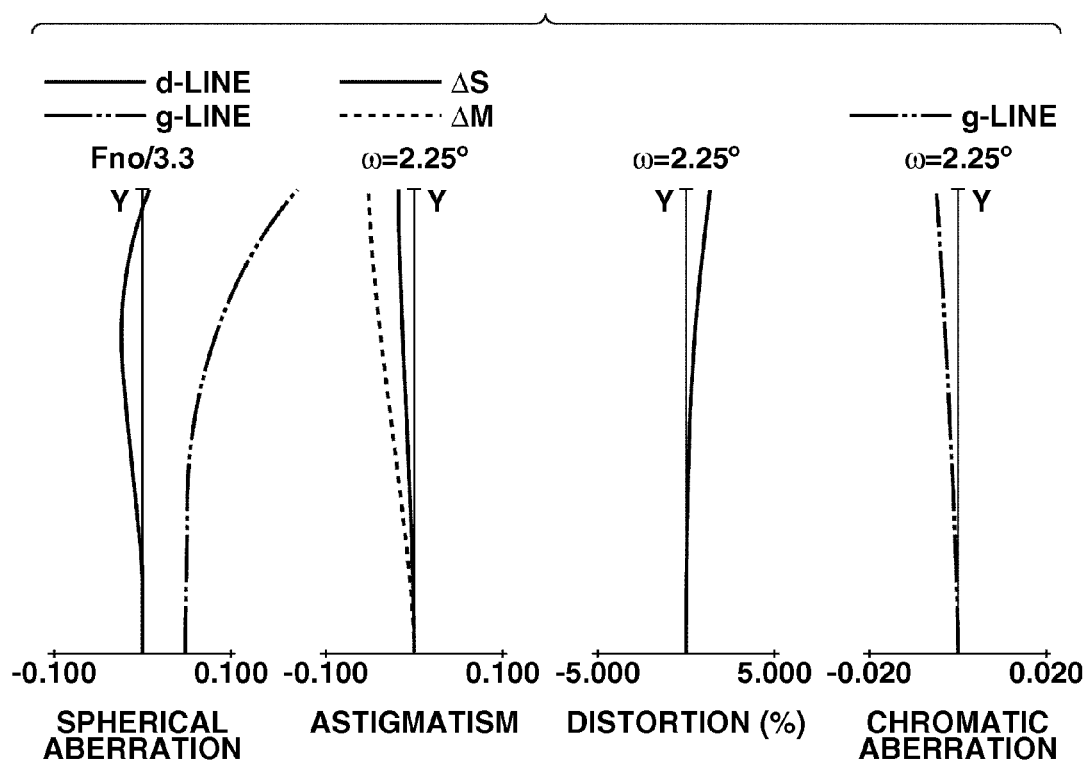
FIG. 12 is an aberration chart for the zoom lens at the telephoto end according to the third exemplary embodiment of the present invention.

FIG. 9 is a cross section illustrating an exemplary lens configuration of a zoom lens according to a third exemplary embodiment of the present invention. FIG. 10 is an aberration chart for the zoom lens at the wide-angle end according to the third exemplary embodiment of the present invention. FIG. 11 is an aberration chart for the zoom lens at a middle zoom position according to the third exemplary embodiment of the present invention. FIG. 12 is an aberration chart for the zoom lens at the telephoto end according to the third exemplary embodiment of the present invention.

Figure 13:
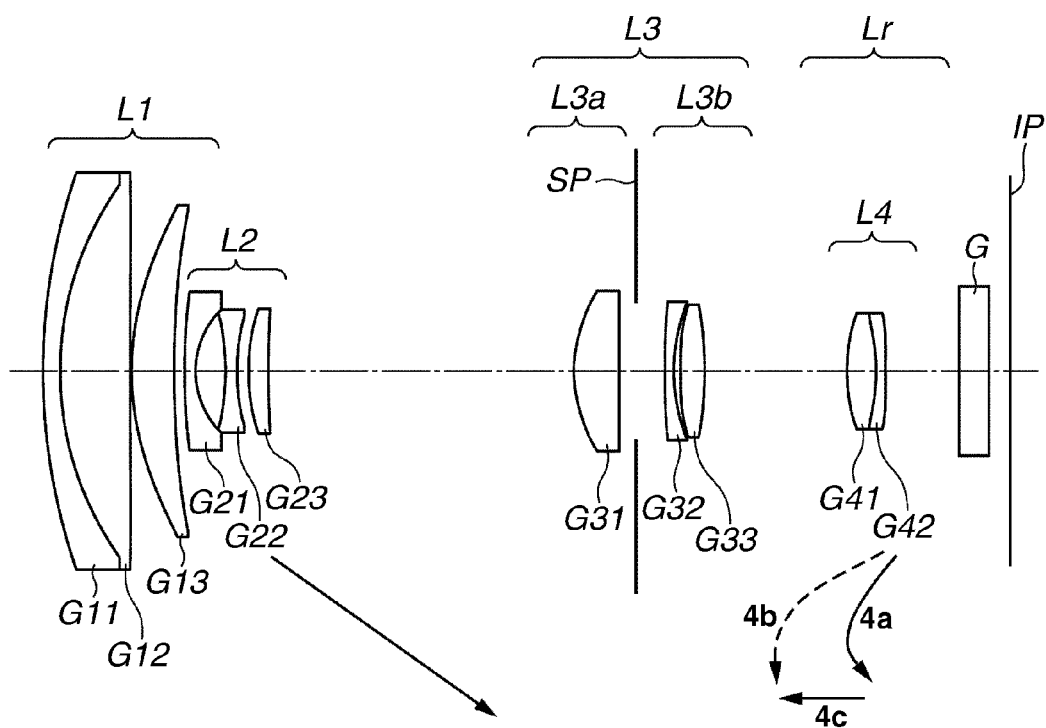
FIG. 13 is a lens cross section of a zoom lens at the wide-angle end according to a fourth exemplary embodiment of the present invention.
Figure 14:
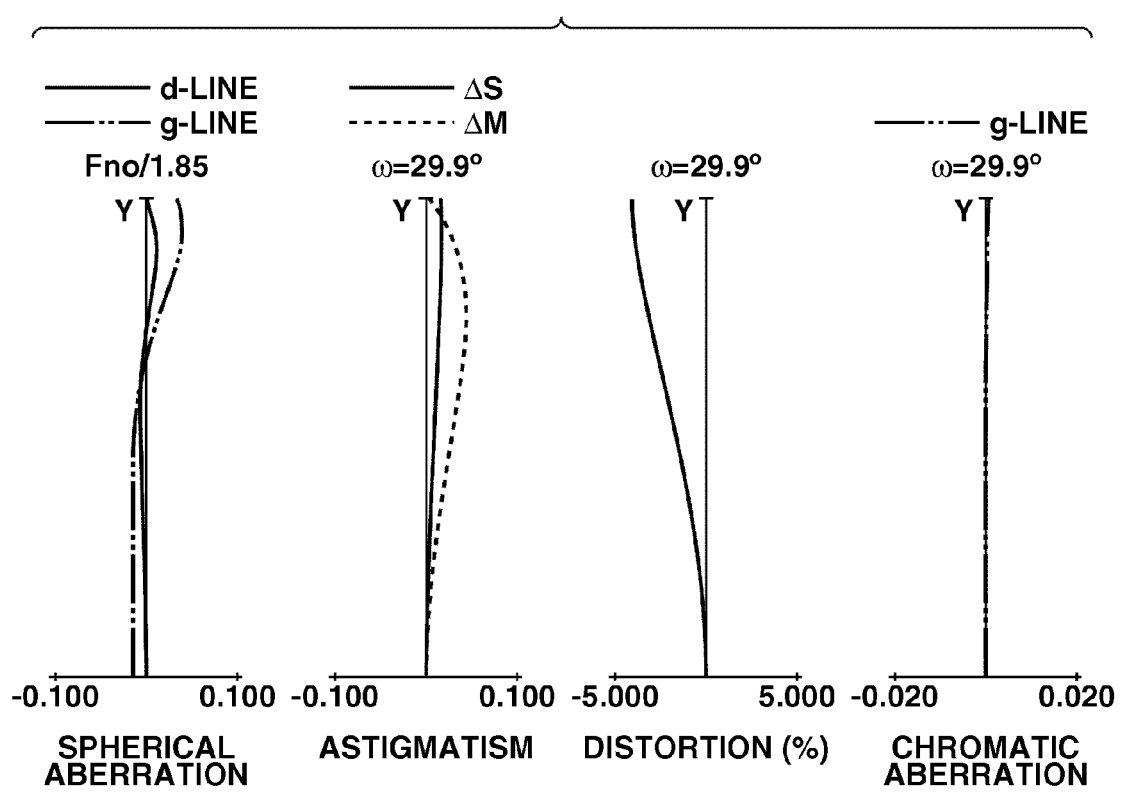
FIG. 14 is an aberration chart for the zoom lens at the wide-angle end according to the fourth exemplary embodiment of the present invention.
Figure 15:
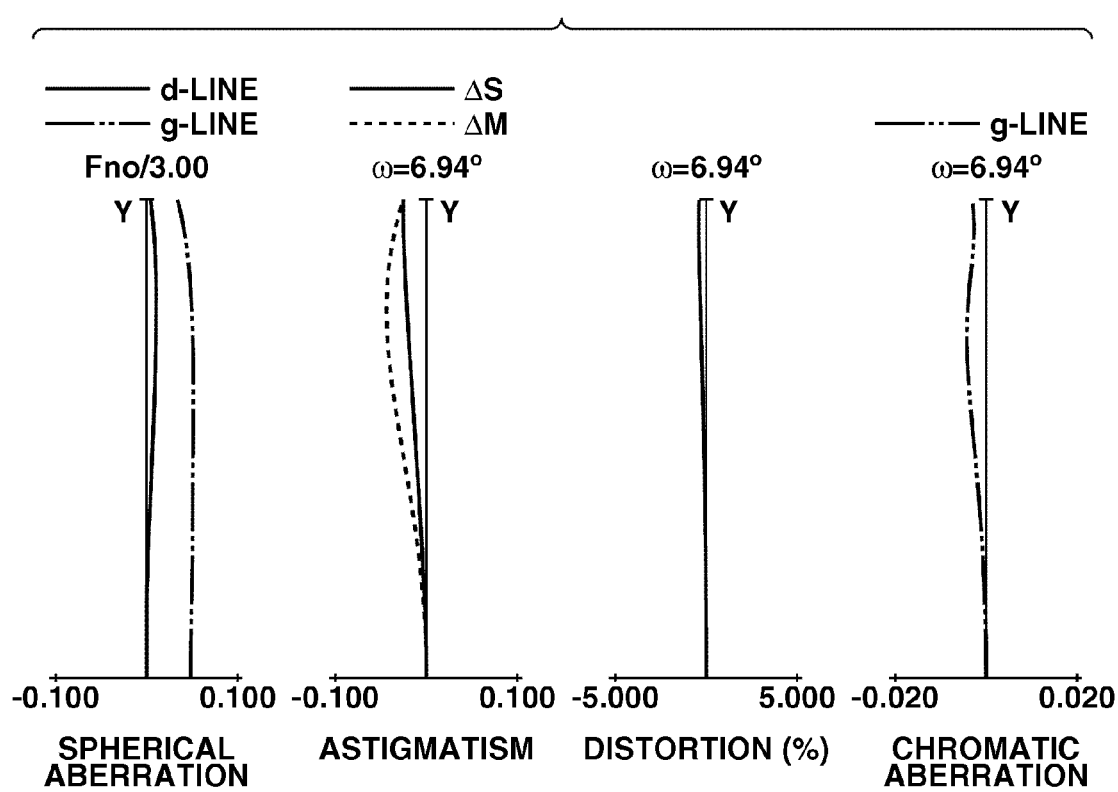
FIG. 15 is an aberration chart for the zoom lens at a middle zoom position according to the fourth exemplary embodiment of the present invention.
Figure 16:
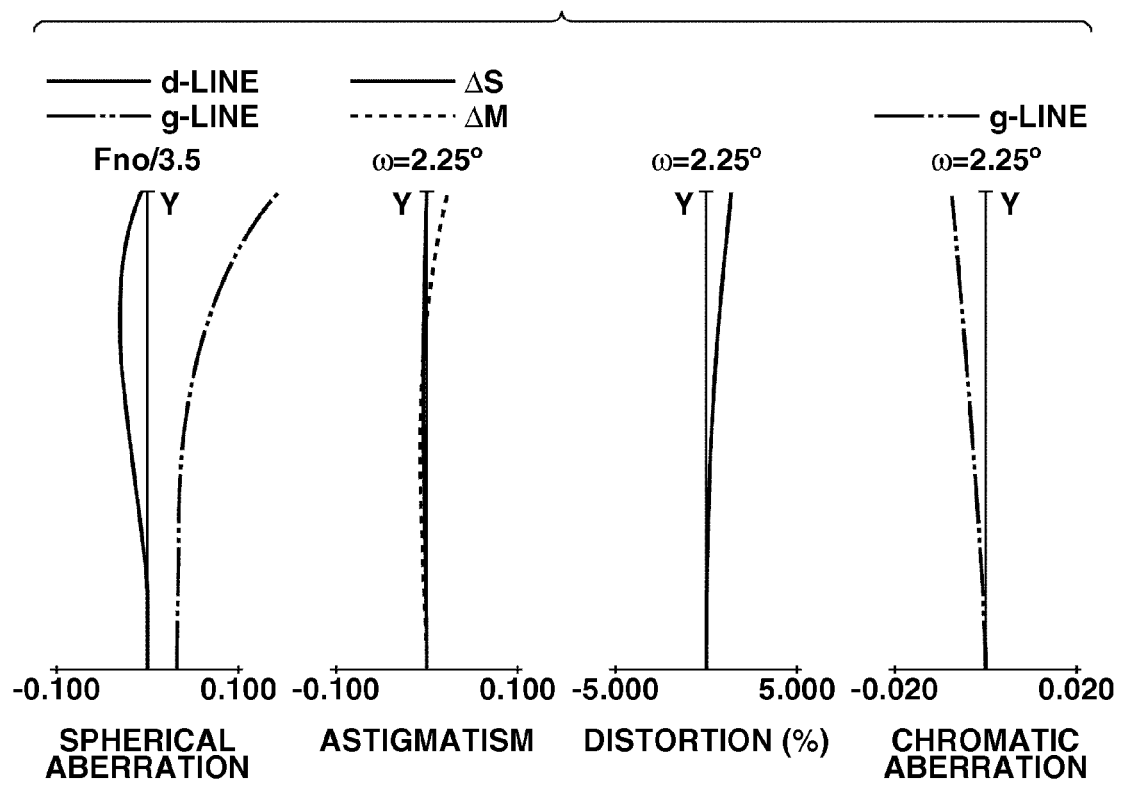
FIG. 16 is an aberration chart for the zoom lens at the telephoto end according to the fourth exemplary embodiment of the present invention.

FIG. 13 is a cross section illustrating an exemplary lens configuration of a zoom lens according to a fourth exemplary embodiment of the present invention. FIG. 14 is an aberration chart for the zoom lens at the wide-angle end according to the fourth exemplary embodiment of the present invention. FIG. 15 is an aberration chart for the zoom lens at a middle zoom position according to the fourth exemplary embodiment of the present invention. FIG. 16 is an aberration chart for the zoom lens at the telephoto end according to the fourth exemplary embodiment of the present invention.

Figure 17:
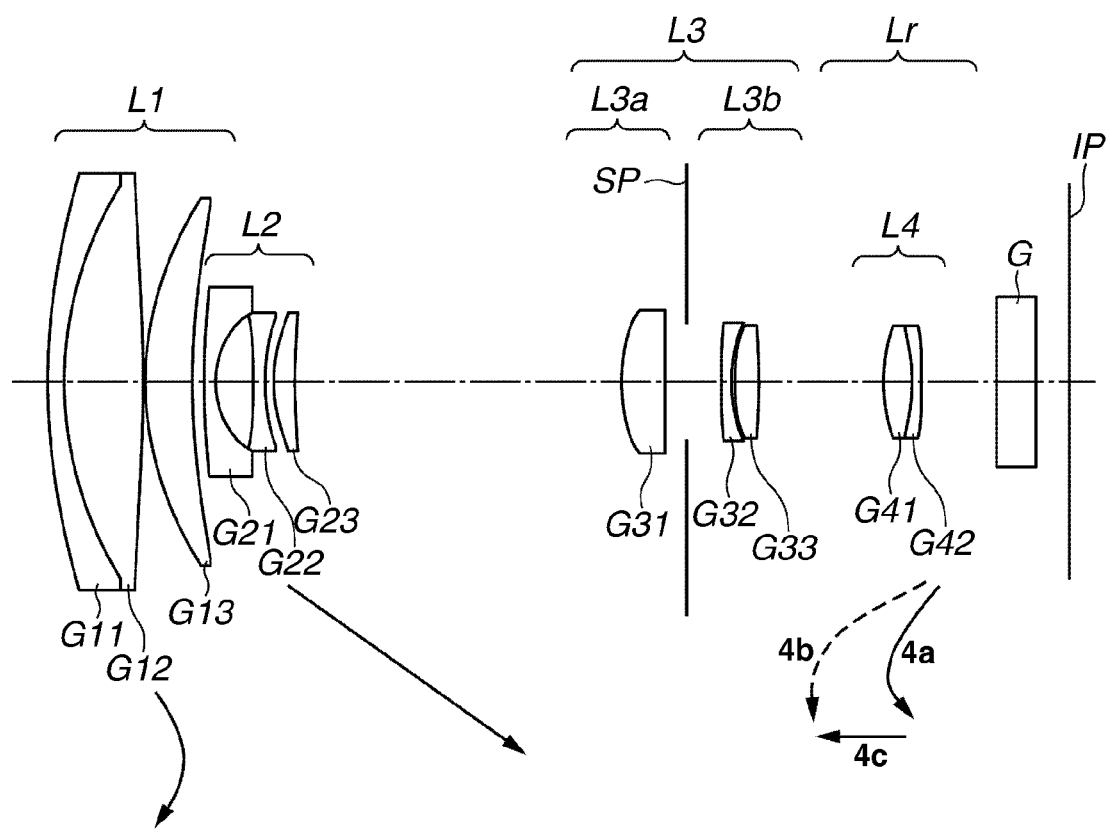
FIG. 17 is a lens cross section of a zoom lens at the wide-angle end according to a fifth exemplary embodiment of the present invention.
Figure 18:
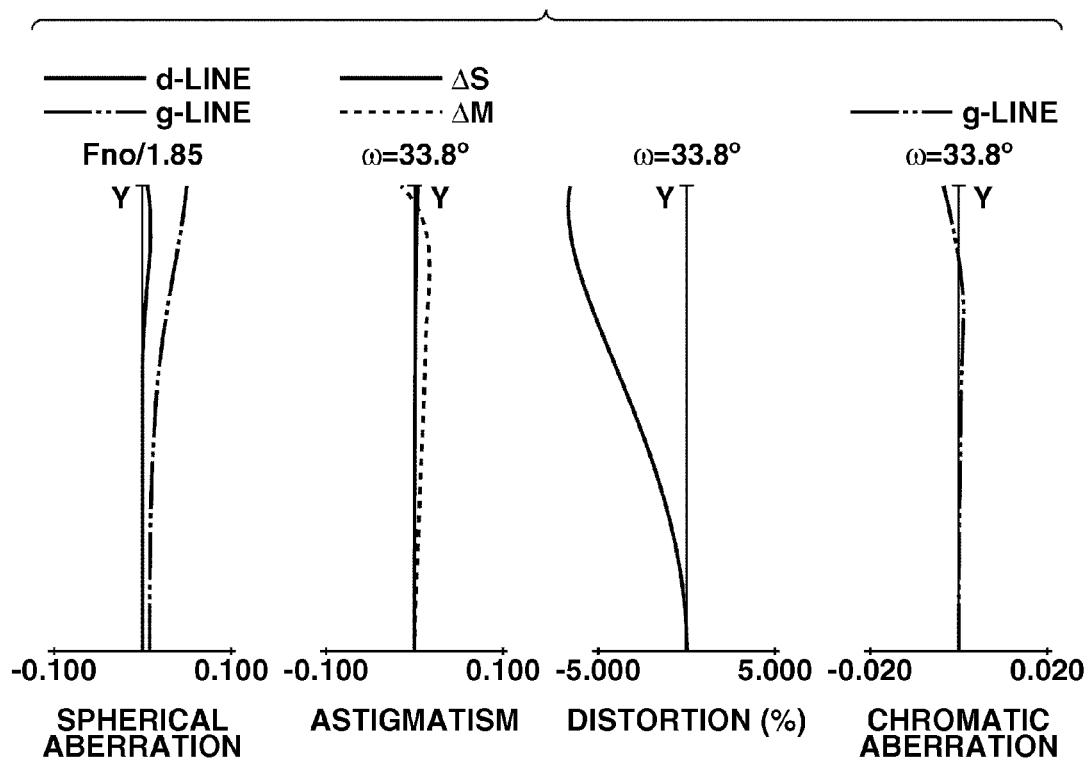
FIG. 18 is an aberration chart for the zoom lens at the wide-angle end according to the fifth exemplary embodiment of the present invention.
Figure 19:
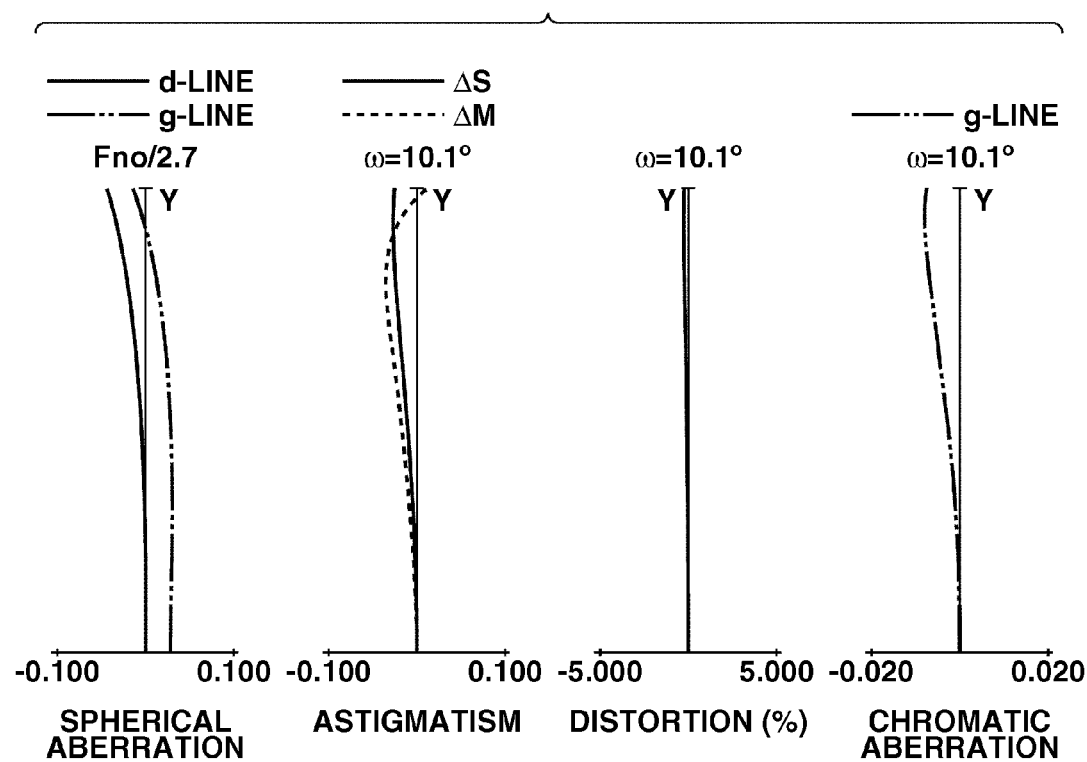
FIG. 19 is an aberration chart for the zoom lens at a middle zoom position according to the fifth exemplary embodiment of the present invention.
Figure 20:
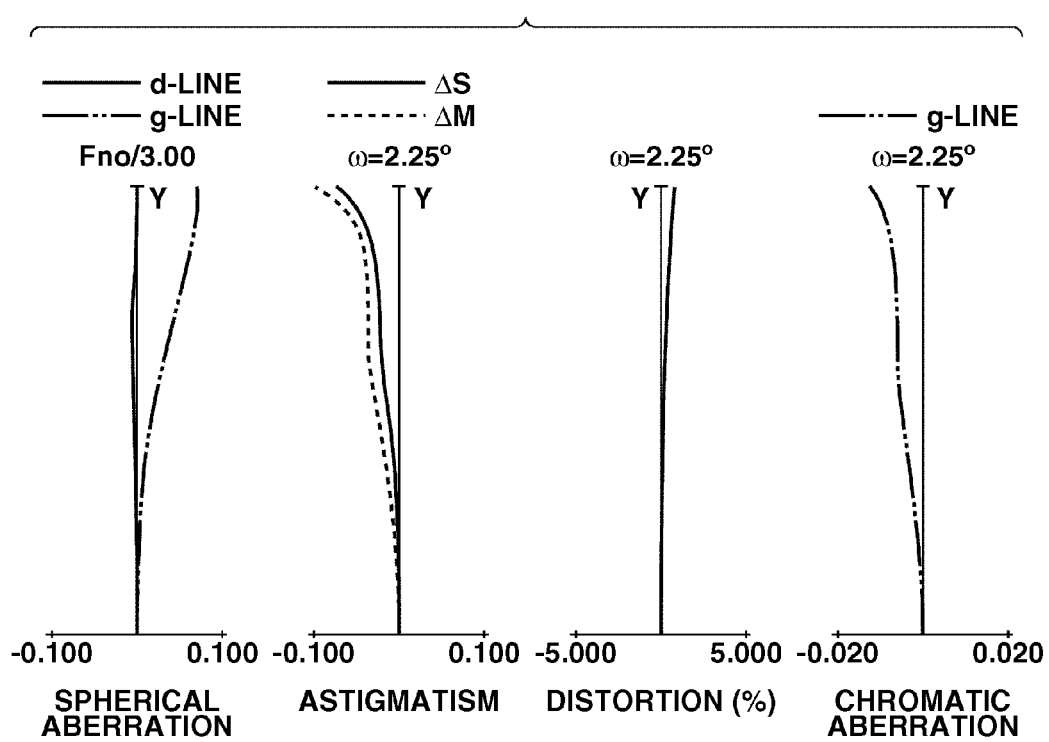
FIG. 20 is an aberration chart for the zoom lens at the telephoto end according to the fifth exemplary embodiment of the present invention.

FIG. 17 is a cross section illustrating an exemplary lens configuration of a zoom lens according to a fifth exemplary embodiment of the present invention. FIG. 18 is an aberration chart for the zoom lens at the wide-angle end according to the fifth exemplary embodiment of the present invention. FIG. 19 is an aberration chart for the zoom lens at a middle zoom position according to the fifth exemplary embodiment of the present invention. FIG. 20 is an aberration chart for the zoom lens at the telephoto end according to the fifth exemplary embodiment of the present invention.

Figure 21:
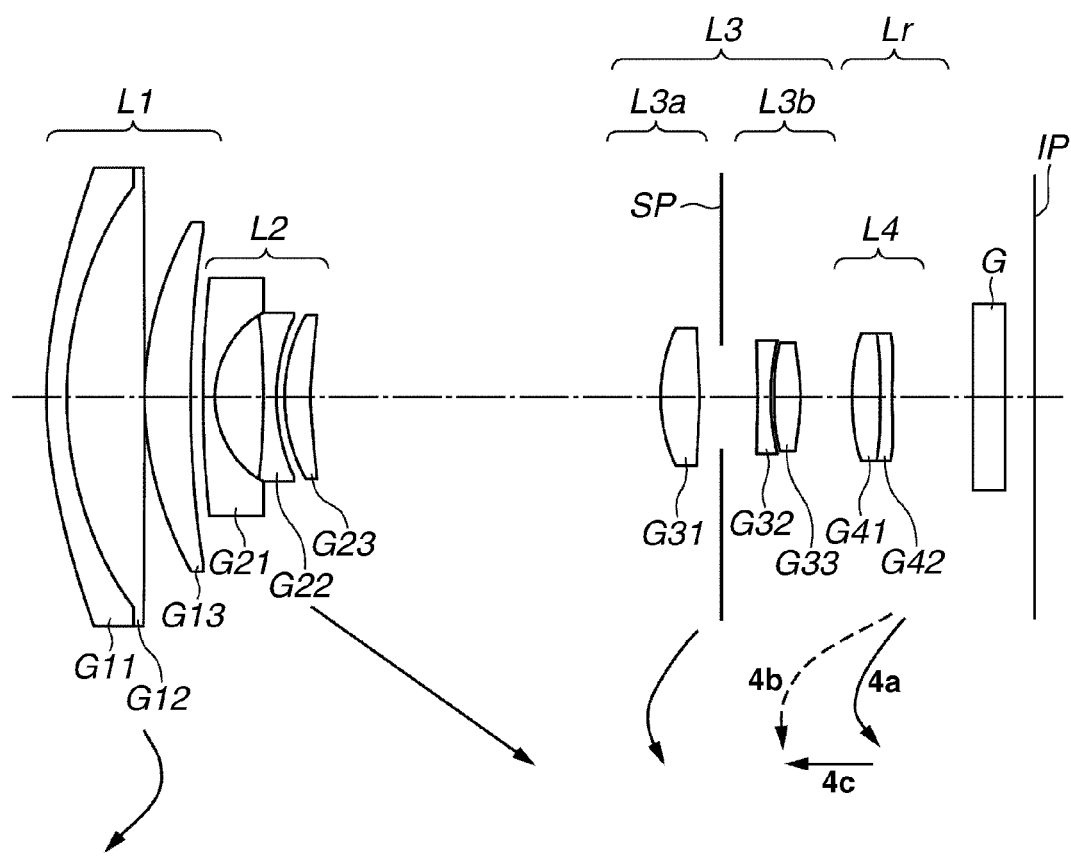
FIG. 21 is a lens cross section of a zoom lens at the wide-angle end according to a sixth exemplary embodiment of the present invention.
Figure 22:
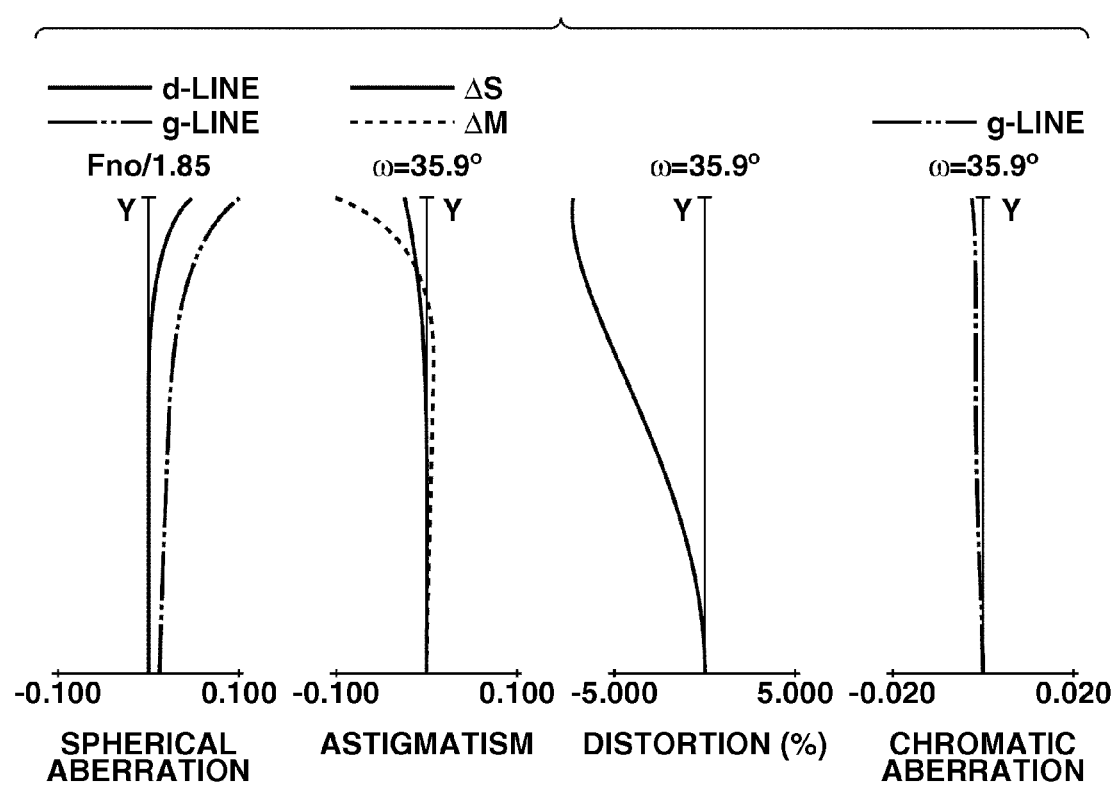
FIG. 22 is an aberration chart for the zoom lens at the wide-angle end according to the sixth exemplary embodiment of the present invention.
Figure 23:
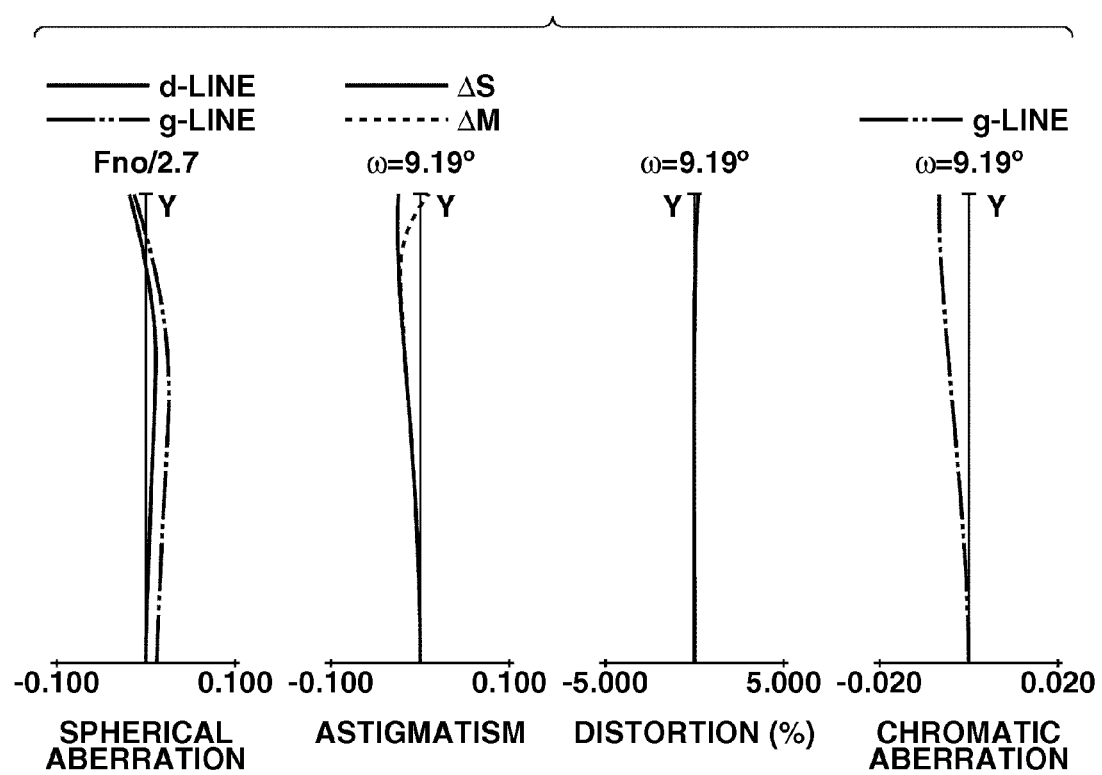
FIG. 23 is an aberration chart for the zoom lens at a middle zoom position according to the sixth exemplary embodiment of the present invention.
Figure 24:
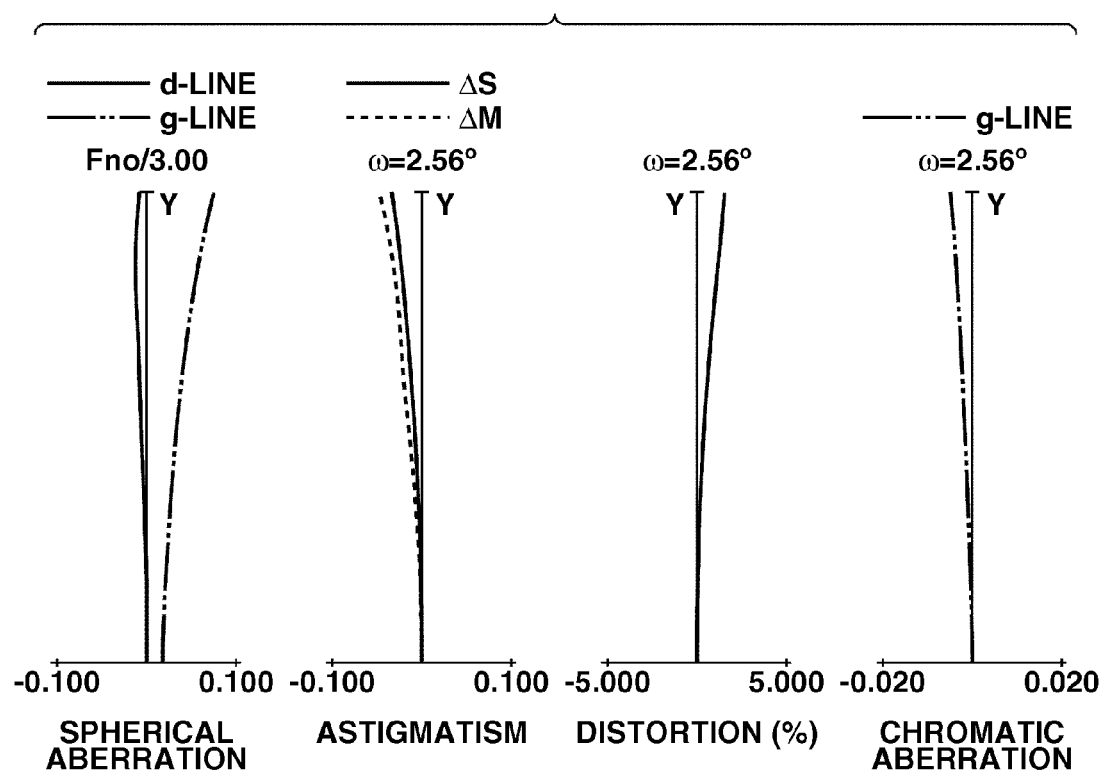
FIG. 24 is an aberration chart for the zoom lens at the telephoto end according to the sixth exemplary embodiment of the present invention.

FIG. 21 is a cross section illustrating an exemplary lens configuration of a zoom lens according to a sixth exemplary embodiment of the present invention. FIG. 22 is an aberration chart for the zoom lens at the wide-angle end according to the sixth exemplary embodiment of the present invention. FIG. 23 is an aberration chart for the zoom lens at a middle zoom position according to the sixth exemplary embodiment of the present invention. FIG. 24 is an aberration chart for the zoom lens at the telephoto end according to the sixth exemplary embodiment of the present invention.

Figure 25:
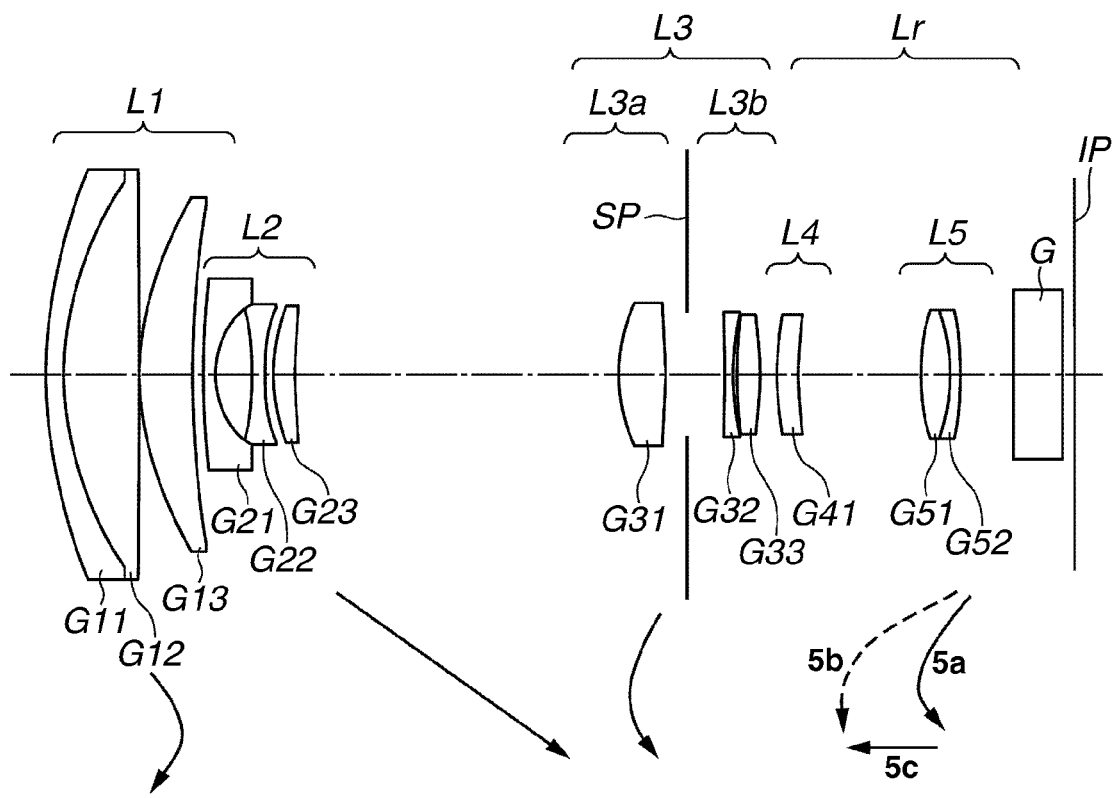
FIG. 25 is a lens cross section of a zoom lens at the wide-angle end according to a seventh exemplary embodiment of the present invention.
Figure 26:
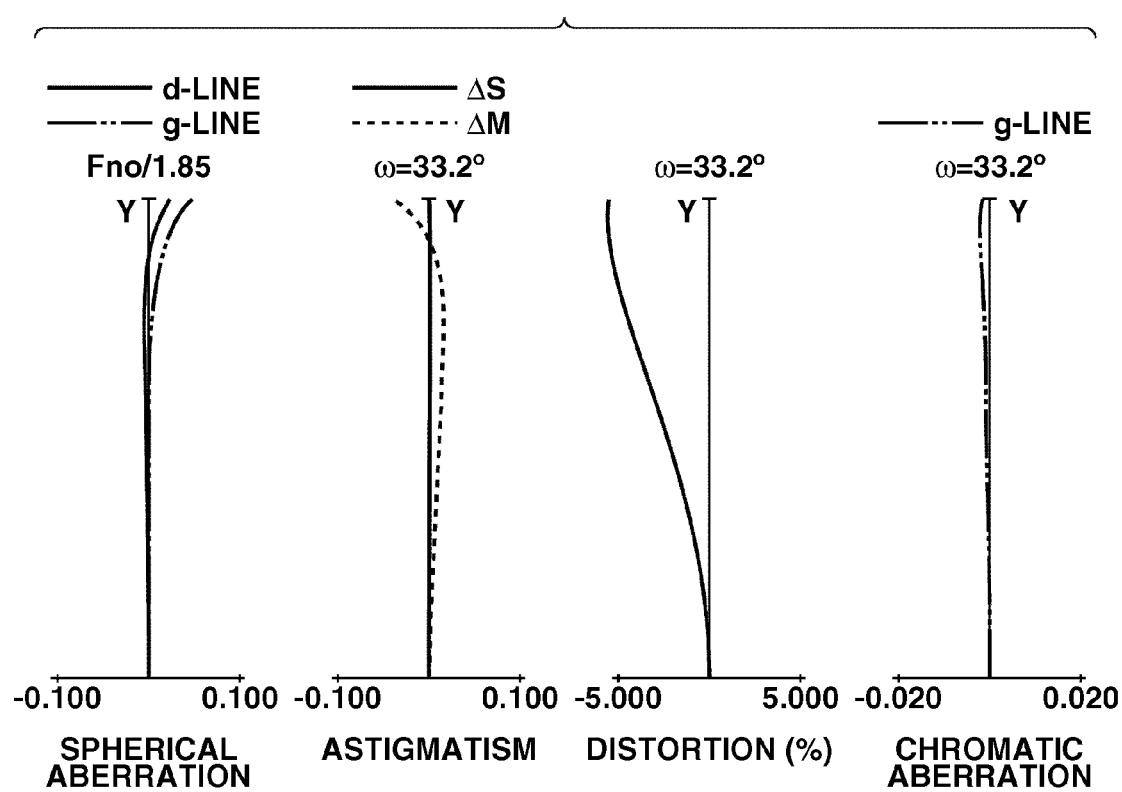
FIG. 26 is an aberration chart for the zoom lens at the wide-angle end according to the seventh exemplary embodiment of the present invention.
Figure 27:
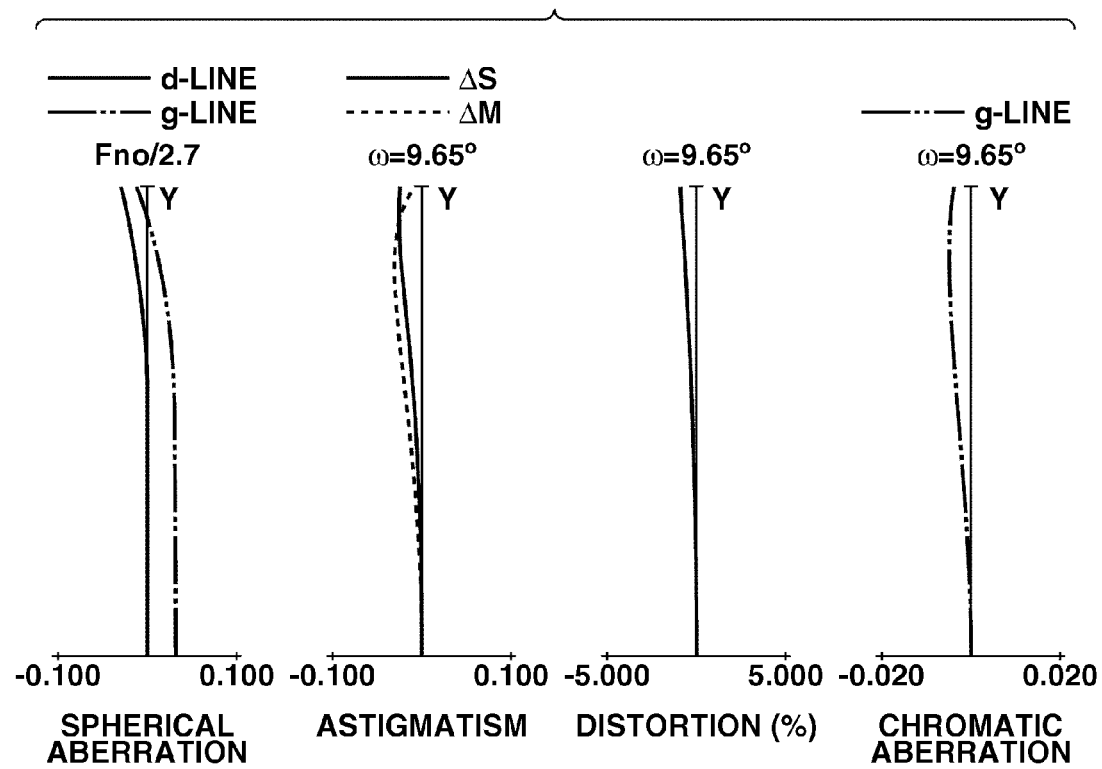
FIG. 27 is an aberration chart for the zoom lens at a middle zoom position according to the seventh exemplary embodiment of the present invention.
Figure 28:
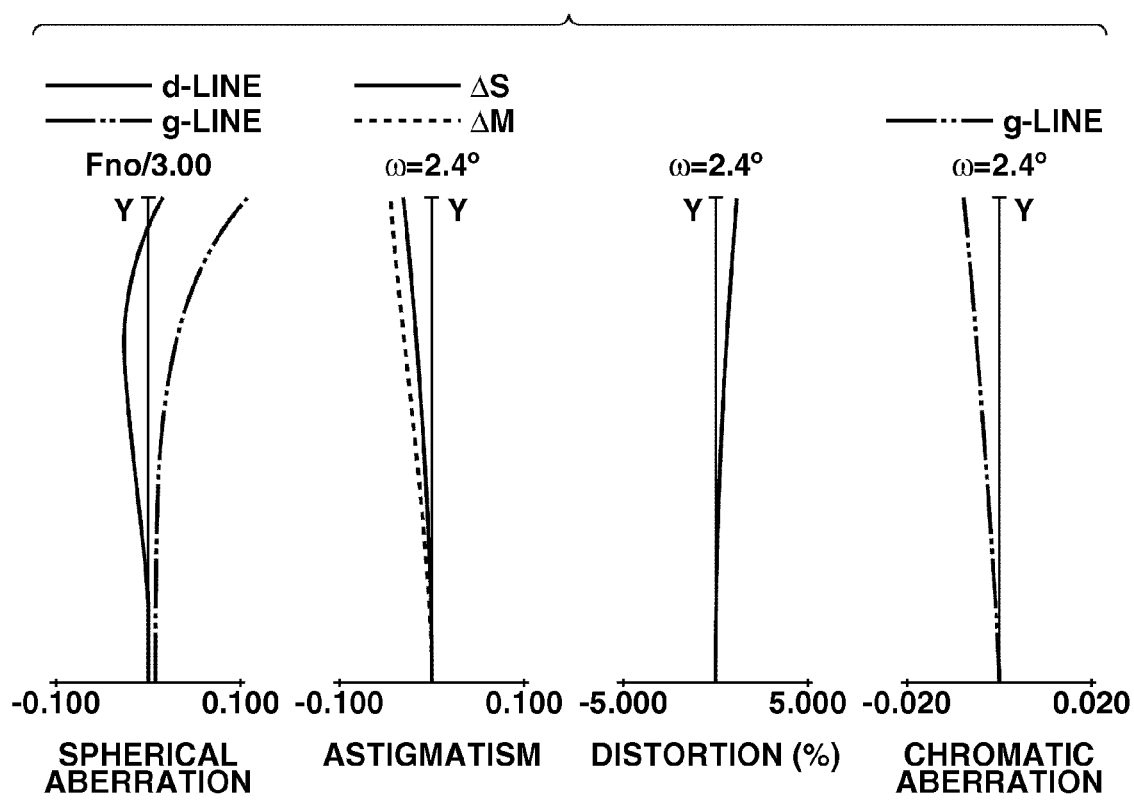
FIG. 28 is an aberration chart for the zoom lens at the telephoto end according to the seventh exemplary embodiment of the present invention.

FIG. 25 is a cross section illustrating an exemplary lens configuration of a zoom lens according to a seventh exemplary embodiment of the present invention. FIG. 26 is an aberration chart for the zoom lens at the wide-angle end according to the seventh exemplary embodiment of the present invention. FIG. 27 is an aberration chart for the zoom lens at a middle zoom position according to the seventh exemplary embodiment of the present invention. FIG. 28 is an aberration chart for the zoom lens at the telephoto end according to the seventh exemplary embodiment of the present invention.

Figure 29:
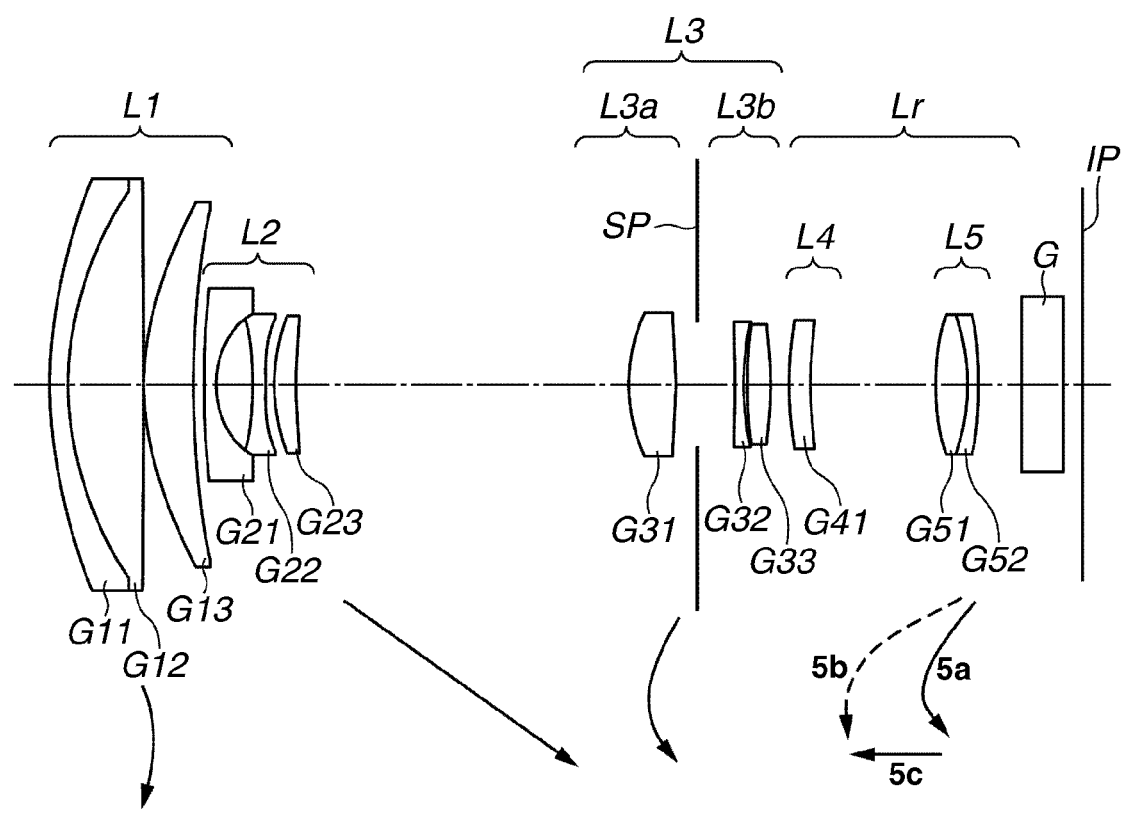
FIG. 29 is a lens cross section of a zoom lens at the wide-angle end according to an eighth exemplary embodiment of the present invention.
Figure 30:
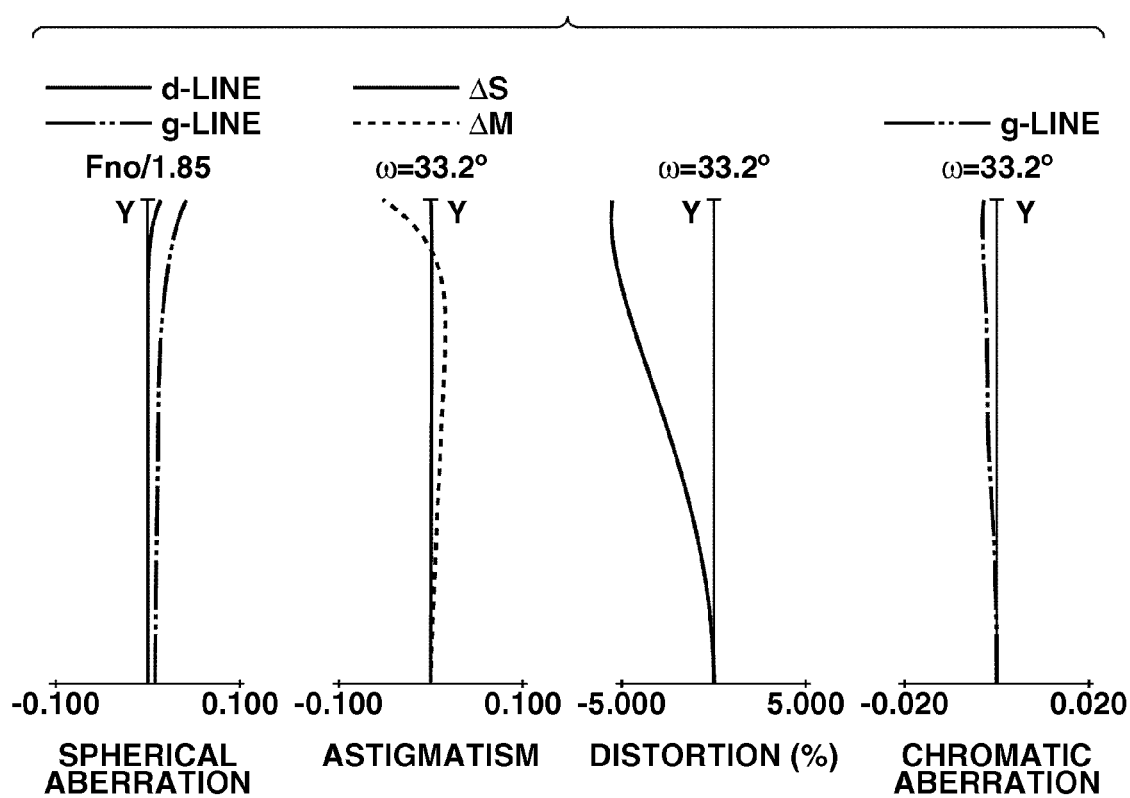
FIG. 30 is an aberration chart for the zoom lens at the wide-angle end according to the eighth exemplary embodiment of the present invention.
Figure 31:
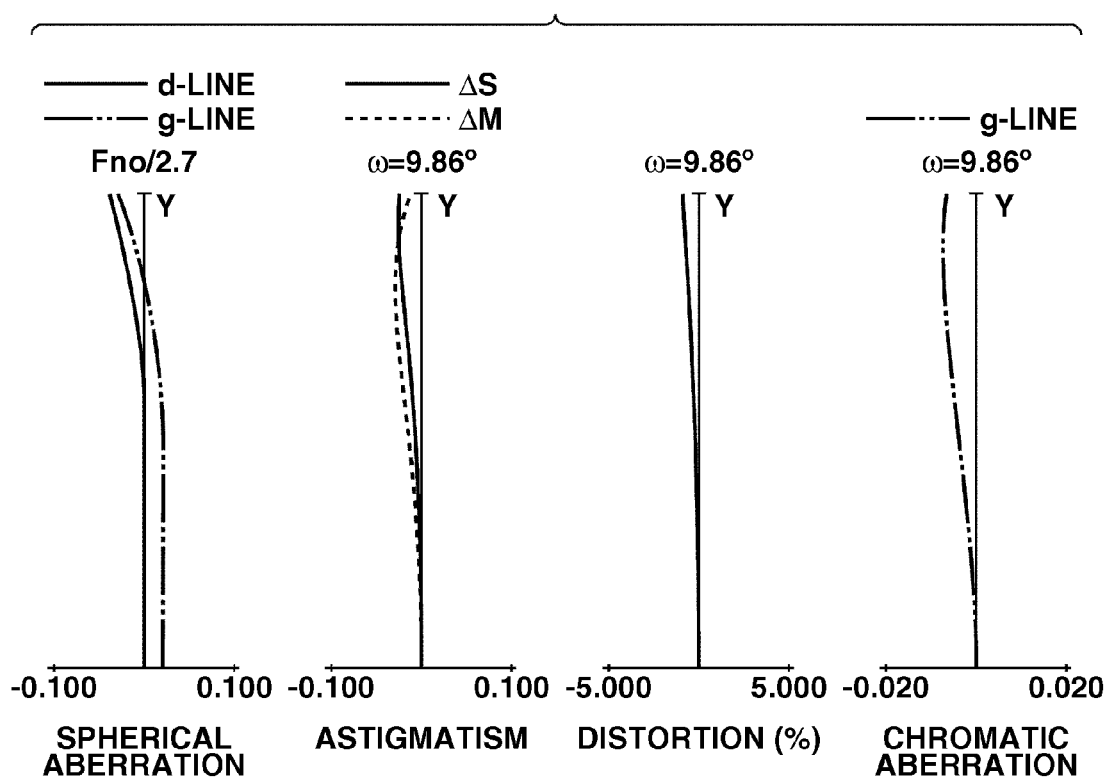
FIG. 31 is an aberration chart for the zoom lens at a middle zoom position according to the eighth exemplary embodiment of the present invention.
Figure 32:
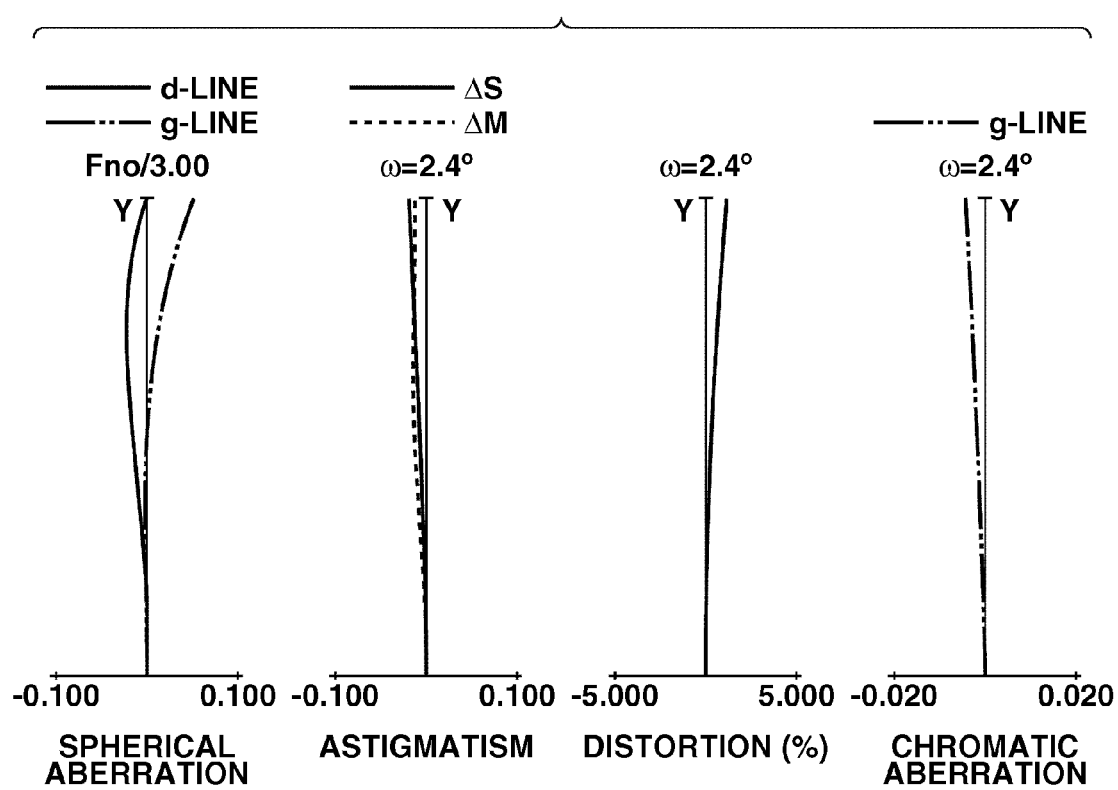
FIG. 32 is an aberration chart for the zoom lens at the telephoto end according to the eighth exemplary embodiment of the present invention.

FIG. 29 is a cross section illustrating an exemplary lens configuration of a zoom lens according to an eighth exemplary embodiment of the present invention. FIG. 30 is an aberration chart for the zoom lens at the wide-angle end according to the eighth exemplary embodiment of the present invention. FIG. 31 is an aberration chart for the zoom lens at a middle zoom position according to the eighth exemplary embodiment of the present invention. FIG. 32 is an aberration chart for the zoom lens at the telephoto end according to the eighth exemplary embodiment of the present invention.

Figure 33:
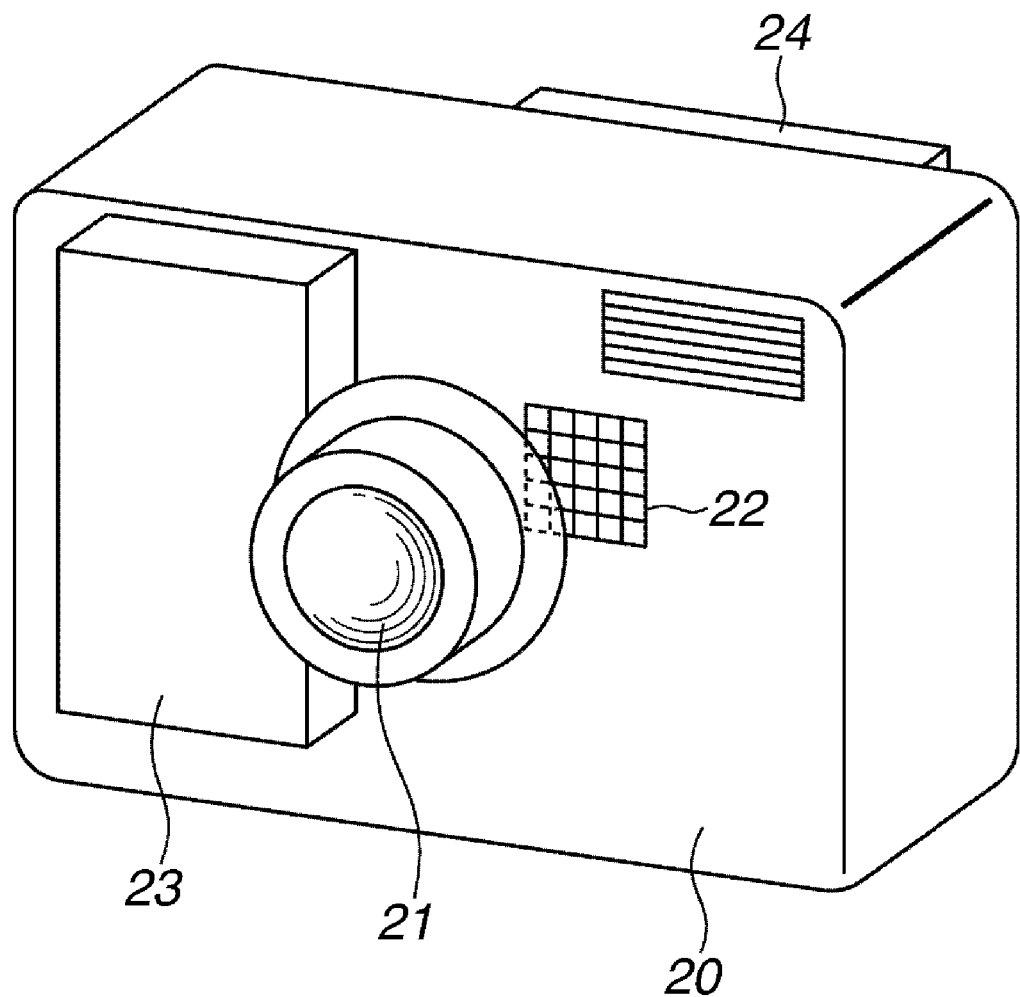
FIG. 33 illustrates an example of components of a digital camera using a zoom lens according to an exemplary embodiment of the present invention.
Figure 34:
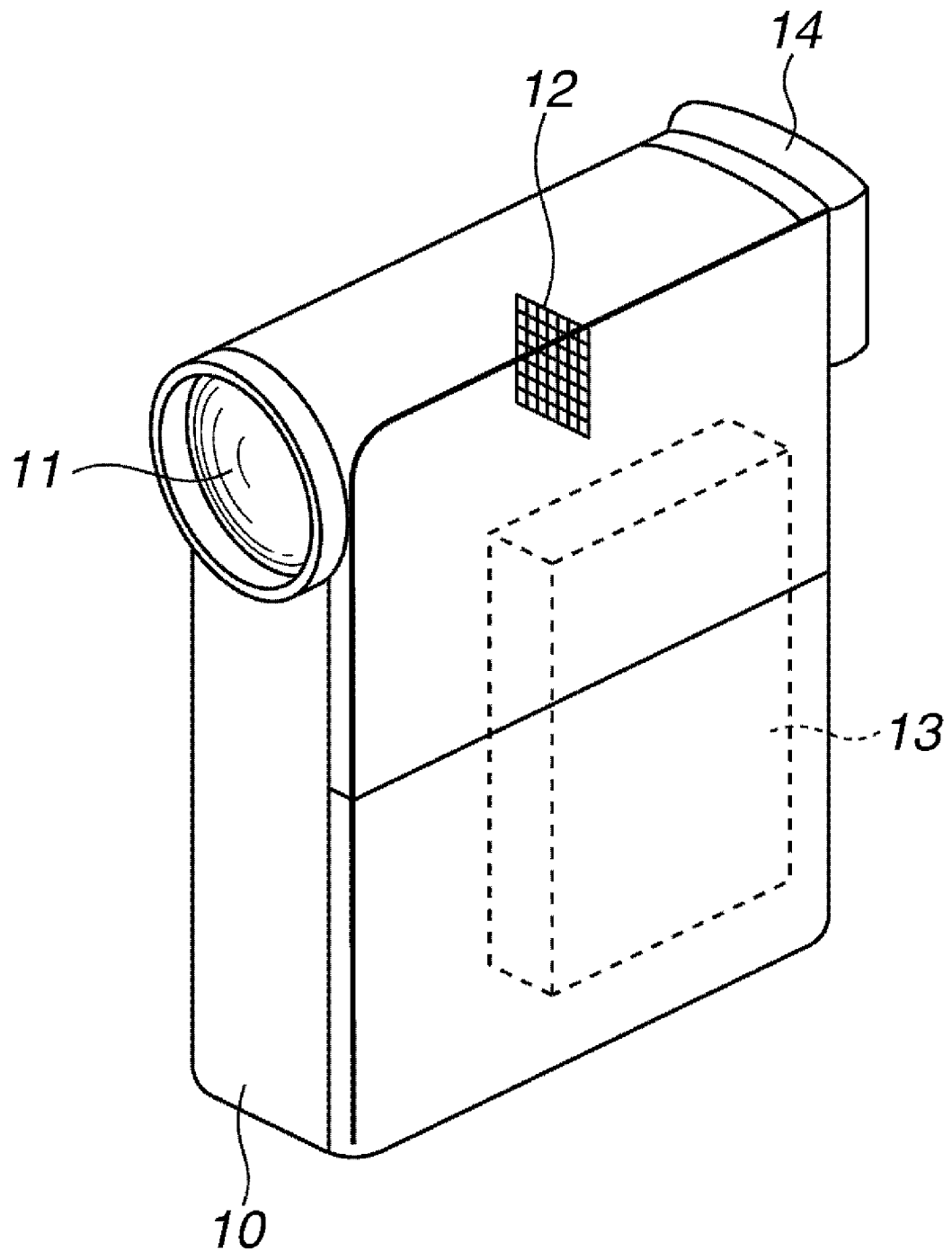
FIG. 34 illustrates an example of components of a video camera using a zoom lens according to an exemplary embodiment of the present invention.

FIGS. 33 and 34 each illustrate an example of main components of a camera (an image pickup apparatus) including a zoom lens according to an exemplary embodiment of the present invention.

The zoom lens according to each exemplary embodiment is a photographic lens system used in an image pickup apparatus, such as video camera or a digital camera. In each of the lens cross sections, the left portion thereof indicates an object side (front side) and the right portion thereof indicates an image side (rear side).

In each of the lens cross sections, "i" denotes the order of the lens units from the object side, "Li" denotes the i-th lens unit. "Lr" denotes the rear lens unit.

Furthermore, "SP" denotes an aperture stop. The aperture stop SP is located inside the third lens unit L3 of the zoom lens according to each exemplary embodiment.

"G" denotes an optical block, such as an optical filter, a face plate (parallel plate glass), a crystal low-pass filter, or an infrared cut-off filter.

"IP" denotes an image plane. In the case where the zoom lens is used as a photographic optical system of a video camera or a digital still camera, an imaging plane of a solid-state image sensor (photoelectric conversion device), such as a charge-coupled device (CCD) sensor or a complementary metal oxide semiconductor (CMOS) sensor, is located on the image plane IP.

In each of the aberration charts, "d" denotes d-line light. "g" denotes g-line light. "ΔM" denotes a meridional image plane. "ΔS" denotes a sagittal image plane. Chromatic aberration of magnification is indicated with g-line light. "ω" denotes a half angle of view. "Fno" denotes F-number.

The Y-axis in the spherical aberration's graph is entrance pupil radius, and the Y-axis in the astigmatism's, distortion's and chromatic aberration's graphs is image height.

In each of the following exemplary embodiments, the "wide-angle end" and the "telephoto end" each refer to a zoom position at which a magnifying lens unit is positioned at the end of a range in which the magnifying lens unit can mechanically move along the optical axis.

An arrow indicates a moving locus of each lens unit during zooming from the wide-angle end to the telephoto end. The zoom lens according to each exemplary embodiment includes, in order from the object side to the image side, a first lens unit L1 having a positive refractive power, a second lens unit L2 having a negative refractive power, and a third lens unit L3 having a positive refractive power. The zoom lens according to each exemplary embodiment further includes a rear lens unit Lr having an overall positive refractive power for the entire zoom range, which includes one or more lens units.

In the zoom lens according to the first through the sixth exemplary embodiments, the rear lens unit Lr includes one fourth lens unit L4 having a positive refractive power. In the zoom lens according to the seventh and the eighth exemplary embodiments, the rear lens unit Lr includes two lens units, namely, a fourth lens unit L4 having a positive refractive power and a fifth lens unit L5 having a positive refractive power.

The rear lens unit Lr according to each of the exemplary embodiments can include three or more lens units.

In each exemplary embodiment, the third lens unit L3 includes, in order from the object side to the image side, a first subunit L3a having a positive refractive power and including one lens component having a positive refractive power, an aperture stop SP, and a second subunit L3b including at lest one negative lens.

With the third lens unit L3 having the above-described configuration, the interval between the second lens unit L2 and the third lens unit L3, which becomes minimal at the telephoto end, can be shortened compared to that in a case where the aperture stop SP is located just in front of the third lens unit L3.

As a result, a variable magnification efficiency of the second lens unit L2, which is a main magnification lens unit, can improve. Therefore, it becomes easy to shorten the total lens length while achieving a high zoom ratio.

Generally, with respect to a lens unit located close to an aperture stop SP, an effective lens diameter is determined based on the diameter of an axial light flux. Accordingly, it is necessary to correct spherical aberration and axial chromatic aberration in particular.

In addition, with respect to a lens unit located close to an aperture stop SP, a light beam height at which an off-axis light flux passes is high. Accordingly, it is necessary to appropriately and effectively correct curvature of field between the wide-angle end and the telephoto end.

In order to correct a plurality of different types of aberrations at the same time, the third lens unit L3 includes one or more positive lenses and negative lenses as a whole.

On a plurality of lens surfaces that are located close to one another in an optical system, the height of the light beam does not vary much. Accordingly, it is easy to correct aberrations similar to one another, but it is difficult to effectively correct different types of aberrations, such as spherical aberration and curvature of field, at the same time.

Therefore, it becomes more useful if the interval between the first subunit L3a and the second subunit L3b becomes wider in the third lens unit L3. That is, if the interval between the first subunit L3a and the second subunit L3b is sufficiently wide, the difference between the heights of the light beams passing through the first subunit L3a and the second subunit L3b may become appropriately great. As a result, it becomes easy to correct aberrations.

On the other hand, if the interval between the first subunit L3a and the second subunit L3b is set wide, the total lens length may increase, which is not useful in terms of reducing the size of the optical system.

In this regard, in each exemplary embodiment, the aperture stop SP is located between the first subunit L3a and the second subunit L3b. With this configuration, the first subunit L3a and the second subunit L3b can be located with an appropriate interval to effectively correct aberrations while reducing the size of the entire lens system.

Furthermore, in each exemplary embodiment, the first subunit L3a and the second subunit L3b are movable in a direction having a component perpendicular to the optical axis to displace an image position. That is, an image stabilization can be effected by correcting the image shake of a captured image occurring when the zoom lens is vibrated.

The aperture stop SP can be moved integrally with the first subunit L3a and the second subunit L3b during an image shake correction. Alternatively, the aperture stop SP can be stationary.

In each exemplary embodiment, the third lens unit L3 includes, in order from the object side to the image side, the first subunit L3a having a positive refractive power, the aperture stop SP, and the second subunit L3b. The first subunit L3a includes one lens component having a positive refractive power. The second subunit L3b includes a negative lens. It is useful that the first subunit L3a includes, as a lens having a refractive power, only the above-mentioned one lens component having a positive refractive power.

A focal length of the first subunit L3a (f3a) and a focal length of the second subunit L3b (f3b) can satisfy the following condition:

$$-0.1 < f3a/f3b < 0.1 \quad (1)$$

Now, a technical significance of the condition (1) is described below.

The condition (1) is concerned with appropriately setting a ratio of the refractive powers (reciprocals of the focal length) of the first subunit L3a and the second subunit L3b.

The third lens unit L3 corrects a plurality of aberrations, such as spherical aberration, axial chromatic aberration, and curvature of field, occurring in the entire zoom range with the first subunit L3a and the second subunit L3b located across the aperture stop SP and operating in cooperation with each other.

Accordingly, if a relative axial offset occurs between the first subunit L3a and the second subunit L3b in the third lens unit L3, the relative height of the light beam passing through the second subunit L3b with respect to the first subunit L3a may vary. In this case, the aberration correction amounts with respect to the first subunit L3a and the second subunit L3b may be off-balanced, which may result in degradation in the imaging performance.

In the case of the condition (1), a value of the focal length f3a is positive since the first subunit L3a has a positive refractive power.

If the refractive power of the second subunit L3b becomes too small in the negative direction exceeding the lower limit of the condition (1) or becomes too large in the positive direction exceeding the upper limit of the condition (1), the height of the light beam passing through the second subunit L3b in the case where a relative axial offset occurs in the third lens unit L3 may greatly vary. Accordingly, in this case, the image performance may greatly degrade.

The ratio of the refractive powers of the first subunit L3a and the second subunit L3b relates to the optical performance in the case where the image stabilization is performed (when an image shake is corrected).

During image stabilization, decentration aberration may occur since the third lens unit L3 is decentered in a direction having a component perpendicular to the optical axis with respect to the lens system.

Here, partial blur due to decentration coma and field tilt may occur in particular due to the decentration aberration during image stabilization.

If the refractive power of the second subunit L3b becomes too large exceeding the lower limit or the upper limit of the condition (1), decentration coma and field tilt may become great when the third lens unit L3 is decentered. Accordingly, in this case, it becomes difficult to achieve a high optical performance over the image plane during image stabilization.

Accordingly, each exemplary embodiment having the above-described configuration can achieve a zoom lens whose size is small, whose optical performance may degrade in only a small degree due to a manufacturing error, such as a relative offset with respect to each lens, and which is suitable to correcting an image shake (image stabilization) and thus can achieve a high image quality.

Furthermore, each exemplary embodiment including the lens units having the above-described lens configuration can achieve a zoom lens whose optical performance may degrade in only a small degree due to a manufacturing error, such as a relative offset with respect to each lens, and which can achieve a high image quality during image stabilization.

It is further useful if a focal length of the rear lens unit Lr at the wide-angle end (fr), an Abbe number of a material of a negative lens G3bn of the second subunit L3b (vd3bn), an Abbe number of a material of a positive lens G3ap that constitutes the first subunit L3a (vd3ap), a focal length of the first subunit (f3a), a focal length of a positive lens G3bp that constitutes the second subunit L3b (f3b p), an imaging magnification of the second subunit L3b at the wide-angle end ($\beta$3bw), an imaging magnification of the second subunit L3b at the telephoto end ($\beta$3bt), an interval between the first subunit L3a and the second subunit L3b (dab), a maximum effective diameter of the aperture of the aperture stop SP located inside the third lens unit L3 at the wide-angle end (Dsp), the effective diameter Dsp being a diameter of a circular aperture satisfying the aperture area in the case where the aperture is not circular, a focal length of the first lens unit L1 (f1), a focal length of the zoom lens at the wide-angle end (fw), a focal length of the zoom lens at the telephoto end (ft), an imaging magnification of the second lens unit L2 at the wide-angle end ($\beta$2w), and an imaging magnification of the second lens unit L2 at the telephoto end ($\beta$2t) can satisfy one or more of the following conditions:

$$3.2 < fr/fw < 6.4 \tag{2}$$

$$20 < vd3bn < 33 \tag{3}$$

$$55 < vd3ap \tag{4}$$

$$0.7 < f3a/f3bp < 1.3 \tag{5}$$

$$0.8 < \beta 3bt/\beta 3bw < 1.2 \tag{6}$$

$$0.1 < dab/Dsp < 1.6 \tag{7}$$

$$1.2 < f1/(fw \cdot ft)^{1/2} < 3.0 \tag{8}$$

$$0.6 < (\beta 2t/\beta 2w)/(ft/fw) < 1.6 \tag{9}$$

A technical significance of each condition is described below.

The condition (2) is concerned with setting an appropriate length (back focus) of the rear lens unit Lr from the last lens surface to the image plane at the wide-angle end.

If the focal length of the rear lens unit Lr becomes too long exceeding the upper limit of the condition (2), the back focus may become too long and thus the total lens length may become very long.

On the other hand, if the focal length of the rear lens unit Lr becomes too short exceeding the lower limit of the condition (2), the back focus becomes too short.

As a result, it becomes difficult to secure a space large enough to dispose a face plate or a low-pass filter, which is to be located on the side of a light entrance surface of a solid-state image sensor, such as a CCD sensor or a CMOS sensor.

Furthermore, in this case, the amount of aberration occurring in the rear lens unit Lr increases. Accordingly, it becomes necessary to increase the number of lenses. Therefore, the size of the entire lens system may become large.

The condition (3) is concerned with effectively correcting chromatic aberration. If the dispersion degree of a material of the negative lens G3bn of the second subunit L3b becomes too small exceeding the upper limit of the condition (3), achromatism with the first subunit L3a having a positive refractive power may become insufficient, which is not useful because axial chromatic aberration may increase in the entire zoom range.

On the other hand, if the dispersion degree of the material of the negative lens G3bn of the second subunit L3b becomes too great exceeding the lower limit of the condition (3), the refractive power given to the negative lens G3bn may become small based on the condition for achromatism with the first subunit L3a having a positive refractive power.

As a result, spherical aberration, axial chromatic aberration, and curvature of field occurring in the entire zoom range, which are to be corrected with the entire third lens unit L3, cannot be sufficiently corrected.

The condition (4) is concerned with effectively correcting chromatic aberration. It is useful that the first subunit L3a is constructed with one positive lens because with this configuration, the size of the entire lens system can be small and the lens unit that moves during image stabilization can be light-weighted.

If the lower limit of the condition (4) is exceeded, chromatic aberration occurring in the first subunit L3a may become too great for the second subunit L3b to correct the same.

The condition (5) defines the ratio of the focal length of the first subunit L3a having a positive refractive power to the focal length of at least one positive lens G3bp of the second subunit L3b and is concerned with effectively correcting curvature of field in particular.

If the refractive power of the positive lens G3bp of the second subunit L3b becomes too large exceeding the upper limit value of the condition (5), spherical aberration occurring in the positive lens G3bp may become great in the negative direction for the negative lens G3bn of the second subunit L3b to correct the same.

On the other hand, if the lower limit of the condition (5) is exceeded, curvature of field on the image plane may become too great towards its lower portion from a middle image height to a maximum image height in the entire zoom range. In this case, it becomes difficult to achieve a high optical performance for the entire image plane.

The condition (6) defines a magnification ratio (the ratio of imaging magnifications) of the second subunit L3b.

If the magnification ratio of the second subunit L3b exceeds the upper limit value (1.2 in the present exemplary embodiment) or the lower limit value (0.8 in the present exemplary embodiment) of the condition (6), spherical aberration occurring due to a relative axial offset of the second subunit L3b to the first subunit L3a may vary too greatly. As a result, it is difficult to manufacture each lens unit, which is not useful.

The condition (7) is concerned with the interval dab between the first subunit L3a and the second subunit L3b and the effective diameter of the full aperture of the aperture stop SP.

If the interval dab between the first subunit L3a and the second subunit L3b becomes too large exceeding the upper limit of the condition (7), the size of the entire zoom lens system may become large, which is not useful.

On the other hand, if the interval dab becomes too small exceeding the lower limit of the condition (7), the difference between the heights of the light beam of the off-axis light beams that pass through the first subunit L3a and the second subunit L3b may become too small to effectively correct curvature of field in the entire zoom range.

Furthermore, if the number of lenses or the number of aspheric surfaces in the second subunit L3b is increased to correct curvature of field, the variance in curvature of field occurring due to a relative axial offset between the first subunit L3a and the second subunit L3b becomes too great to manufacture each lens component.

Note that if the aperture of the aperture stop SP has a shape other than a circular shape, the effective diameter Dsp is defined as a diameter of a circle whose aperture area is equal to that of the aperture stop SP having a shape other than a circular shape.

The condition (8) is concerned with the focal length of first lens unit L1.

If the focal length f1 of the first lens unit L1 becomes too long exceeding the upper limit of the condition (8), the effect of variable magnification by the movement of the second lens unit L2 becomes small. Accordingly, the amount of movement of the second lens unit L2 during zooming may become too great and the total lens length becomes too long, which is not useful.

On the other hand, if the focal length f1 of the first lens unit L1 becomes too short exceeding the lower limit of the condition (8), spherical aberration is under-corrected at the telephoto end and axial chromatic aberration may increase.

The condition (9) defines a magnification ratio of the second lens unit L2.

If the magnification ratio of the second lens unit L2 may become too great exceeding the upper limit of the condition (9), the third lens unit L3 becomes an intense reducing lens system, and thus an angle of incidence of an outermost light flux incident to the lens surface of a lens of the first subunit L3a located closest to the object side may become too large.

As a result, spherical aberration occurring in the first subunit L3a may become under-corrected at the wide-angle end. In this case, it becomes difficult to correct spherical aberration with the entire third lens unit L3. Furthermore, in this case, spherical aberration occurring due to a relative axial offset between the first subunit L3a and the second subunit L3b may become too large to manufacture each lens component.

On the other hand, if the magnification ratio of the second lens unit L2, which is a main magnification lens unit, becomes too small exceeding the lower limit of the condition (9), the magnification assignment assigned to the rear lens unit Lr, which is located following the third lens unit L3, may become too great. As a result, it becomes necessary to increase the number of lenses in the rear lens unit Lr. In this case, the size of the entire lens system may increase, which is not useful.

Note that it is more useful to set the range of the values of the conditions (1) through (9) as follows:

$$-0.1 < f3a/f3b < 0.08 \quad (1a)$$

$$3.4 < fr/fw < 6.0 \quad (2a)$$

$$25 < vd3bn < 32 \quad (3a)$$

$$55 < vd3ap < 75 \quad (4a)$$

$$0.75 < f3a/f3bp < 1.3 \quad (5a)$$

$$0.9 < \beta 3bt/\beta 3bw < 1.1 \quad (6a)$$

$$0.2 < dab/Dsp < 0.8 \quad (7a)$$

$$1.4 < f1/(fw/ft)^{1/2} < 2.7 \quad (8a)$$

$$0.7 < (\beta 2t/\beta 2w)/(ft/fw) < 1.5 \quad (9a).$$

Furthermore, it is yet more useful to set the range of the values of the conditions (1a) through (9a) as follows:

$$-0.08 < f3a/f3b < 0.08 \quad (1b)$$

$$3.5 < fr/fw < 5.6 \quad (2b)$$

$$25 < vd3bn < 30 \quad (3b)$$

$$58 < vd3ap < 72 \quad (4b)$$

$$0.75 < f3a/f3bp < 1.25 \quad (5b)$$

$$0.95 < d3bt/\beta 3bw < 1.05 \quad (6b)$$

$$0.3 < dab/Dsp < 0.6 \quad (7b)$$

$$1.5 < f1/(fw/ft)^{1/2} < 2.5 \quad (8b)$$

$$0.8 < (\beta 2t/\beta 2w)/(ft/fw) < 1.4 \quad (9b).$$

Furthermore, it is yet more useful to set the upper limit value of the condition (1b) at 0.07 and the upper limit value of the condition (2b) at 5.4.

In addition, it is yet more useful if the first subunit L3a is constructed with one positive lens G3ap and the positive lens G3ap has at least one aspheric surface.

According to the above-described configuration, it becomes easy to effectively correct spherical aberration and astigmatism in the entire zoom range.

In addition, it is useful if the second lens unit L2 includes, in order from the object side to the image side, a negative lens having a meniscus shape whose surface on the object side has a convex shape, a negative lens whose surface on the image side has a concave shape, and a positive lens whose surface on the object side has a convex shape.

With the second lens unit L2 having the above-described configuration, it becomes easy to effectively correct various aberrations, such as curvature of field and distortion, occurring during zooming while providing a refractive power intense enough to perform magnification.

In addition, it is useful if one lens unit constituting the rear lens unit Lr is movable along a locus convex towards the object side during zooming from the wide-angle end to the telephoto end.

With the one lens unit of the rear lens unit Lr moving along the locus convex towards the object side during zooming from the wide-angle end to telephoto end, the space between the third lens unit L3 and the image plane can be effectively utilized and it becomes easy to effectively reduce the total lens length.

Each exemplary embodiment is described in detail below. In the description of each exemplary embodiment, the lens configuration according thereto is described. With respect to the lens configuration, the lens elements are located in order from the object side to the image side unless otherwise noted herein.

In the zoom lenses according to the first through the fourth exemplary embodiments illustrated in FIGS. 1, 5, 9, and 13, the interval between adjacent lens units is variable to perform zooming. During zooming from the wide-angle end to the telephoto end, the second lens unit L2 is movable towards the image side to perform main variable magnification.

During zooming, the first lens unit L1 and the third lens unit L3 are stationary. The fourth lens unit L4 is movable to compensate for variation of the image plane caused by the variable magnification and to perform focusing.

With the fourth lens unit L4 movable along a locus convex towards the object side during zooming, the space between the third lens unit L3 and the fourth lens unit L4 can be effectively utilized and the total lens length can be effectively reduced. Here, it is useful if the fourth lens unit L4 moves along a convex locus, along which the fourth lens unit L4 moves towards the image side after moving towards the object side (a moving locus convex towards the object side) during zooming from the wide-angle end to the telephoto end.

Furthermore, the present invention employs a rear focus type zoom lens system that performs focusing from an infinitely distant object to a close object at the telephoto end by moving the fourth lens unit L4 towards the front side as indicated by an arrow 4c.

A solid curve 4a with respect to the fourth lens unit L4 indicates a moving locus for the fourth lens unit L4 in the case of compensating for the variation of the image plane caused by zooming from the wide-angle end to the telephoto end when focusing is performed on an infinitely distant object. A dotted curve 4b with respect to the fourth lens unit L4 indicates a moving locus for the fourth lens unit L4 in the case of compensating for the variation of the image plane caused by zooming from the wide-angle end to the telephoto end when focusing is performed on a close object.

Now, the lens configuration of the first through the fourth exemplary embodiments is described below.

The first lens unit L1 includes three lenses, namely, a cemented lens composed of a negative lens G11 having a meniscus shape whose surface on the object side has a convex shape and a positive lens G12 and a positive lens G13 having a meniscus shape whose surface on the object side has a convex shape.

With the first lens unit L1 constructed with three lenses having the above-described configuration, the zoom lens according to an exemplary embodiment of the present invention can effectively correct spherical aberration, axial chromatic aberration, and chromatic aberration of magnification while achieving a high zoom ratio.

The second lens unit L2 includes a negative lens G21 having a meniscus shape whose surface on the object side has a convex shape, a negative lens G22 whose surface on the image side has a concave shape, and a positive lens G23 whose surface on the object side has a convex shape. With the second lens unit L2 constructed with three lenses having the above-described configuration, the zoom lens system according to an exemplary embodiment of the present invention can reduce or suppress the variation of aberrations occurring during zooming.

The third lens unit L3 includes the first subunit L3a including a positive lens G31 whose surface on the object side has a convex shape and the second subunit L3b including a negative lens G32 whose surface on the image side has a concave shape and a positive lens G33 both of whose surfaces have a convex shape. Here, it is useful if the second subunit L3b includes one or more negative lenses.

Note that the first subunit L3a can be constructed with a lens component, such as a cemented lens composed of a positive lens and a negative lens, instead of a single positive lens.

The first subunit L3a and the second subunit L3b are located with a predetermined air space (interval) therebetween for effectively correcting curvature of field in the entire zoom range as well as correcting spherical aberration and axial chromatic aberration.

The aperture stop SP is located in that air space. With this configuration, the space within the third lens unit L3 can be effectively utilized and the total lens length can be reduced.

Moreover, since the aperture stop SP is located inside the third lens unit L3, the interval between the second lens unit L2 and the third lens unit L3 at the telephoto end can be shortened compared to that in the case where the aperture stop SP is located just in front of the third lens unit L3. Thus, the total lens length can be reduced.

The positive lens G31, whose surface on the object side has an aspheric shape, can serve to effectively correct spherical aberration.

In the first and the second exemplary embodiments, the surface of the positive lens G33 on the object side has an aspheric shape. Thus, spherical aberration and astigmatism, in particular, can be effectively corrected. In the third and the fourth exemplary embodiments, the surface of the positive lens G31 on the image side has an aspheric shape. Thus, spherical aberrations and astigmatism, in particular, can be effectively corrected.

The fourth lens unit L4 includes a cemented lens composed of a positive lens G41 both of whose surfaces have a convex shape and a negative lens G42 having a meniscus shape whose surface on the image side has a convex shape. With the fourth lens unit L4 including a cemented lens composed of the positive lens G41 and the negative lens G42, the variation of aberrations occurring when the fourth lens unit L4 is moved during zooming and focusing can be reduced.

In the fifth exemplary embodiment illustrated in FIG. 17, zooming is performed by changing the interval between adjacent lens units.

By moving the first lens unit L1 so that the first lens unit L1 comes to a position closer to the object side at the telephoto end than that at the wide-angle end, the total lens length at the wide-angle end can be reduced while achieving a high magnification ratio.

During zooming from the wide-angle end to the telephoto end, the second lens unit L2 is moved towards the image side to perform main variable magnification.

During zooming, the third lens unit L3 is stationary. The fourth lens unit L4 is movable in a similar manner as in the first through the fourth exemplary embodiments.

In the fifth exemplary embodiment, the first lens unit L1, as well as the second lens unit L2 and the fourth lens unit L4, is movable along a locus convex towards the image side during zooming from the wide-angle end to the telephoto end. Thus, the variable magnification effect of the second lens unit L2 is increased to achieve a zoom ratio as high as 17 or higher.

In the sixth exemplary embodiment illustrated in FIG. 21, zooming is performed by varying the interval between adjacent lens units.

By moving the first lens unit L1 so that the first lens unit L1 comes to a position closer to the object side at the telephoto end than that at the wide-angle end, the total lens length at the wide-angle end can be reduced while achieving a high magnification ratio.

During zooming from the wide-angle end to the telephoto end, the second lens unit L2 is movable towards the image side to perform main variable magnification.

During zooming from the wide-angle end to the telephoto end, the third lens unit L3 is movable along a locus convex towards the object side. The fourth lens unit L4 is movable in a similar manner as in the first through the fourth exemplary embodiments.

Furthermore, in the sixth exemplary embodiment, the variable magnification effect of the second lens unit L2, which performs main variable magnification, is further intensified by moving all of the four lens units. Furthermore, the effect of correcting the variation of curvature of field occurring during zooming with the third lens unit L3 is increased.

Thus, the sixth exemplary embodiment can achieve a zoom ratio as high as 16 or higher while achieving a wide angle of view.

The interval between adjacent lens units is varied to perform zooming in the seventh and the eighth exemplary embodiments illustrated in FIGS. 25 and 29.

By moving the first lens unit L1 so that the first lens unit L1 comes to a position closer to the object side at the telephoto end than that at the wide-angle end, the total lens length at the wide-angle end can be reduced while achieving a high magnification ratio.

During zooming from the wide-angle end to the telephoto end, the second lens unit L2 is movable towards the image side to perform main variable magnification.

The third lens unit L3 moves along a locus convex towards the object side during zooming from the wide-angle end to the telephoto end. The fourth lens unit L4 is stationary during zooming.

The fifth lens unit L5 is movable along a locus convex towards the object side during zooming. Thus, the space between the fourth lens unit L4 and the fifth lens unit L5 can be effectively utilized and the total lens length can be shortened.

Here, it is useful if the third lens unit L3 or the fifth lens unit L5 moves along a convex locus, along which the third lens unit L3 or the fifth lens unit L5 moves towards the image side after moving towards the object side (a moving locus convex towards the object side) during zooming from the wide-angle end to the telephoto end.

Furthermore, during focusing from an infinitely distant object to a close object at the telephoto end, the fifth lens unit L5 is moved towards the front as indicated by an arrow 5c. It is to be noted that the fourth lens unit L4 can be subordinately driven (moved) during focusing. In this case, the amount of aberration variation occurring during focusing can be reduced.

A solid curve 5a with respect to the fifth lens unit L5 indicates a moving locus for the fifth lens unit L5 in the case of compensating for the variation of the image plane caused by zooming from the wide-angle end to the telephoto end when focusing is performed on an infinitely distant object. A dotted curve 5b with respect to the fifth lens unit L5 indicates a moving locus for the fifth lens unit L5 in the case of compensating for the variation of the image plane caused by zooming from the wide-angle end to the telephoto end when focusing is performed on a close object.

In the seventh and the eighth exemplary embodiments, the second lens unit L2 performs main variable magnification, and the first lens unit L1, the third lens unit L3, and the fifth lens unit L5 are movable during zooming. Thus, the variable magnification is shared by these lens units to achieve a zoom ratio as high as 15 or higher.

The first lens unit L1, the second lens unit L2, and the third lens unit L3 each have a similar lens configuration as that in the fifth and the sixth exemplary embodiment. The fourth lens unit L4 is constructed with a positive lens G41 whose surface on the object side has a convex shape.

The fifth lens unit L5 includes a cemented lens composed of a positive lens G51 both of whose surfaces have a convex shape and a negative lens G52 having a meniscus shape whose surface on the image side has a convex shape. With the fifth lens unit L5 having the cemented lens composed of the positive lens G51 and the negative lens G52, the variation of aberrations occurring when the fifth lens unit L5 is moved during zooming or focusing can be reduced.

In each exemplary embodiment, F-numbers described in the following numerical examples are achieved by controlling the dimension of the effective diameter of the aperture stop SP during zooming from the wide-angle end to the telephoto end.

Accordingly, flared light components that may affect the imaging performance outside the optical axis from a middle zoom range to the telephoto end can be cut off to achieve a high image quality in the entire zoom range. Here, a maximum effective diameter of the aperture of the aperture stop SP can be obtained at the wide-angle end.

Furthermore, in each exemplary embodiment, with respect to correcting the variation in distortion occurring during zooming, it is also useful if the image pickup apparatus using a solid-state image sensor digitally corrects distortion when digitally processing a captured image.

Now, numerical examples 1 through 8 respectively corresponding to the first through the eighth exemplary embodiments are described.

In each of the numerical examples 1 through 8, "i" denotes the order of a surface from the object side. "ri" denotes a curvature of field of the i-th optical surface. "di" denotes an interval between the i-th surface and the (i+1)-th surface. "ndi" denotes a refractive index of the i-th medium with respect to d-line light. "vdi" denotes an Abbe number of the i-th medium with respect to d-line light. "IP" denotes an image plane.

A back focus (BF) is a value obtained by calculating an air-equivalent distance from the last lens surface to a paraxial image plane. The total lens length is defined as a value obtained by adding the back focus (BF) to the distance from the frontmost lens surface to the last lens surface. The unit for the length is millimeter (mm).

The aspheric shape can be expressed by the following expression:

$$X = \frac{(1/R)H^2}{1+\sqrt{1-(1+K)(H/R)^2}} + A4H^4 + A6H^6 + A8H^8 + A10H^{10} + A12H^{12}$$

where "K" denotes an eccentricity (conical coefficient), each of "A4", "A6", "A8", "A10", and "A12" denotes an aspheric coefficient, "x" denotes a displacement from a surface vertex along the optical axis at a position with a height "h" from the optical axis, and "R" denotes a paraxial radius of curvature. "E-Z" denotes "$10^{-Z}$".

In addition, the relationship between each condition above and each exemplary embodiment is set forth in Table 1 (see page 57).

Numerical Example 1

Surface Data

| | | | |
|---|---|---|---|
| r1 = 42.952 | d1 = 1.15 | nd1 = 1.84666 | vd1 = 23.9 |
| r2 = 21.753 | d2 = 4.20 | nd2 = 1.60311 | vd2 = 60.6 |
| r3 = −322.228 | d3 = 0.18 | | |
| r4 = 19.297 | d4 = 2.65 | nd3 = 1.69680 | vd3 = 55.5 |
| r5 = 53.195 | d5 = Variable | | |
| r6 = 51.889 | d6 = 0.70 | nd4 = 1.88300 | vd4 = 40.8 |
| r7 = 5.592 | d7 = 2.16 | | |
| r8 = −24.811 | d8 = 0.60 | nd5 = 1.71300 | vd5 = 53.9 |
| r9 = 12.701 | d9 = 0.75 | | |
| r10 = 10.804 | d10 = 1.40 | nd6 = 1.92286 | vd6 = 18.9 |
| r11 = 39.919 | d11 = Variable | | |
| r12* = 9.298 | d12 = 2.50 | nd7 = 1.58313 | vd7 = 59.4 |
| r13 = ∞ | d13 = 1.30 | | |
| r14 (Stop) = ∞ | d14 = 2.20 | | |
| r15 = 47.126 | d15 = 0.60 | nd8 = 1.76182 | vd8 = 26.5 |
| r16 = 9.220 | d16 = 0.26 | | |
| r17* = 11.034 | d17 = 2.25 | nd9 = 1.58313 | vd9 = 59.4 |
| r18 = −56.284 | d18 = Variable | | |
| r19 = 15.643 | d19 = 2.40 | nd10 = 1.80400 | vd10 = 46.6 |
| r20 = −12.062 | d20 = 0.55 | nd11 = 1.84666 | vd11 = 23.9 |
| r21 = −97.799 | d21 = Variable | | |
| r22 = ∞ | d22 = 2.50 | nd12 = 1.51633 | vd12 = 64.1 |
| r23 = ∞ | d23 = 1.51 | | |
| IP = ∞ | | | |

Aspheric Coefficients

| | | |
|---|---|---|
| r12 | K = 5.31511e−001 | A4 = −1.75571e−004 |
| | A6 = −2.15369e−006 | A8 = −3.16337e−008 |
| r17 | K = −1.73310e+000 | A4 = −1.50969e−005 |

Various Data
Zoom ratio: 11.77

| | Wide-Angle End | Middle Zoom Positions | Telephoto End |
|---|---|---|---|
| Focal Length | 4.94 | 23.49 | 58.17 |
| F-number | 1.85 | 2.70 | 3.00 |
| Angle of View | 28.11 | 6.41 | 2.60 |
| Image Height | 2.64 | 2.64 | 2.64 |
| Total lens length | 59.50 | 59.50 | 59.50 |
| BF | 8.55 | 11.93 | 5.57 |
| d5 | 0.70 | 14.29 | 18.58 |
| d11 | 18.59 | 5.00 | 0.71 |
| d18 | 5.81 | 2.43 | 8.79 |
| d21 | 5.39 | 8.78 | 2.42 |

Zoom Lens Unit Data

| Lens Unit | First Surface | Focal Length |
|---|---|---|
| 1 | 1 | 29.81 |
| 2 | 6 | −6.29 |
| 3 | 12 | 16.70 |
| 4 | 19 | 17.84 |

Numerical Example 2

Surface Data

| | | | |
|---|---|---|---|
| r1 = 36.365 | d1 = 1.20 | nd1 = 1.84666 | vd1 = 23.9 |
| r2 = 21.206 | d2 = 4.90 | nd2 = 1.60311 | vd2 = 60.6 |
| r3 = −905.732 | d3 = 0.20 | | |
| r4 = 19.948 | d4 = 3.25 | nd3 = 1.60311 | vd3 = 60.6 |
| r5 = 56.239 | d5 = Variable | | |
| r6 = 59.921 | d6 = 0.70 | nd4 = 1.88300 | vd4 = 40.8 |
| r7 = 5.627 | d7 = 2.30 | | |
| r8 = −18.930 | d8 = 0.60 | nd5 = 1.77250 | vd5 = 49.6 |
| r9 = 13.123 | d9 = 0.73 | | |
| r10 = 11.845 | d10 = 1.40 | nd6 = 1.92286 | vd6 = 18.9 |
| r11 = 88.886 | d11 = Variable | | |
| r12* = 9.223 | d12 = 2.60 | nd7 = 1.58313 | vd7 = 59.4 |
| r13 = 614.034 | d13 = 1.30 | | |
| r14 (Stop) = ∞ | d14 = 2.20 | | |
| r15 = 127.180 | d15 = 0.60 | nd8 = 1.76182 | vd8 = 26.5 |
| r16 = 10.130 | d16 = 0.32 | | |
| r17* = 11.718 | d17 = 2.10 | nd9 = 1.58313 | vd9 = 59.4 |
| r18 = −30.178 | d18 = Variable | | |
| r19 = 14.871 | d19 = 2.30 | nd10 = 1.69680 | vd10 = 55.5 |
| r20 = −18.738 | d20 = 0.60 | nd11 = 1.84666 | vd11 = 23.9 |
| r21 = −72.687 | d21 = Variable | | |
| r22 = ∞ | d22 = 2.10 | nd12 = 1.51633 | vd12 = 64.1 |
| r23 = ∞ | d23 = 1.45 | | |
| IP = ∞ | | | |

Aspheric Coefficients

| | | |
|---|---|---|
| r12 | K = −3.29687e−001 | A4 = −3.30543e−005 |
| | A6 = −5.72043e−007 | A8 = 6.00834e−009 |
| r17 | K = −2.09746e+000 | A4 = −4.52812e−005 |
| | A6 = −4.39745e−007 | |

Various Data
Zoom ratio: 13.74

| | Wide-Angle End | Middle Zoom Positions | Telephoto End |
|---|---|---|---|
| Focal Length | 5.00 | 23.59 | 68.70 |
| F-number | 1.85 | 2.70 | 3.00 |
| Angle of View | 28.20 | 6.48 | 2.23 |
| Image Height | 2.68 | 2.68 | 2.68 |
| Total lens length | 63.36 | 63.36 | 63.36 |
| BF | 8.27 | 13.13 | 5.63 |
| d5 | 0.75 | 14.53 | 19.37 |
| d11 | 19.33 | 5.55 | 0.70 |
| d18 | 7.71 | 2.86 | 10.36 |
| d21 | 5.44 | 10.30 | 2.80 |

-continued

Zoom Lens Unit Data

| Lens Unit | First Surface | Focal Length |
|---|---|---|
| 1 | 1 | 31.30 |
| 2 | 6 | -5.86 |
| 3 | 12 | 16.45 |
| 4 | 19 | 19.95 |

Numerical Example 3

Surface Data

| | | | |
|---|---|---|---|
| r1 = 39.914 | d1 = 1.15 | nd1 = 1.84666 | vd1 = 23.9 |
| r2 = 21.357 | d2 = 4.90 | nd2 = 1.60311 | vd2 = 60.6 |
| r3 = -798.513 | d3 = 0.18 | | |
| r4 = 20.011 | d4 = 3.05 | nd3 = 1.69680 | vd3 = 55.5 |
| r5 = 57.339 | d5 = Variable | | |
| r6 = 53.625 | d6 = 0.70 | nd4 = 1.88300 | vd4 = 40.8 |
| r7 = 5.288 | d7 = 2.25 | | |
| r8 = -17.244 | d8 = 0.60 | nd5 = 1.78800 | vd5 = 47.4 |
| r9 = 14.154 | d9 = 0.60 | | |
| r10 = 11.629 | d10 = 1.40 | nd6 = 1.92286 | vd6 = 18.9 |
| r11 = 108.219 | d11 = Variable | | |
| r12* = 9.466 | d12 = 2.80 | nd7 = 1.58313 | vd7 = 59.4 |
| r13* = -54.703 | d13 = 1.20 | | |
| r14 (Stop) = ∞ | d14 = 2.10 | | |
| r15 = 52.536 | d15 = 0.60 | nd8 = 1.80518 | vd8 = 25.4 |
| r16 = 9.082 | d16 = 0.30 | | |
| r17 = 14.702 | d17 = 1.60 | nd9 = 1.69680 | vd9 = 55.5 |
| r18 = -40.832 | d18 = Variable | | |
| r19 = 13.434 | d19 = 2.00 | nd10 = 1.6968 | vd10 = 55.5 |
| r20 = -15.798 | d20 = 0.55 | nd11 = 1.80518 | vd11 = 25.4 |
| r21 = -72.463 | d21 = Variable | | |
| r22 = ∞ | d22 = 1.5 | nd12 = 1.51633 | vd12 = 64.1 |
| r23 = ∞ | d23 = 1.76 | | |
| IP = ∞ | | | |

Aspheric Coefficients

| | | |
|---|---|---|
| r12 | K = -2.05475e-001 | A4 = -5.07587e-005 |
| | A6 = -6.87140e-007 | A8 = 1.11739e-008 |
| r13 | K = -6.32108e+001 | A4 = 6.09935e-005 |

Various Data
Zoom ratio: 14.60

| | Wide-Angle End | Middle Zoom Positions | Telephoto End |
|---|---|---|---|
| Focal Length | 4.67 | 22.19 | 68.20 |
| F-number | 1.85 | 2.95 | 3.30 |
| Angle of View | 29.86 | 6.89 | 2.25 |
| Image Height | 2.68 | 2.68 | 2.68 |
| Total lens length | 61.06 | 61.06 | 61.06 |
| BF | 7.34 | 12.09 | 4.61 |
| d5 | 0.70 | 14.25 | 19.01 |
| d11 | 19.02 | 5.47 | 0.70 |
| d18 | 8.02 | 3.27 | 10.75 |
| d21 | 4.59 | 9.34 | 1.86 |

Zoom Lens Unit Data

| Lens Unit | First Surface | Focal Length |
|---|---|---|
| 1 | 1 | 30.05 |
| 2 | 6 | -5.62 |
| 3 | 12 | 15.49 |
| 4 | 19 | 17.95 |

Numerical Example 4

Surface Data

| | | | |
|---|---|---|---|
| r1 = 38.075 | d1 = 1.05 | nd1 = 1.84666 | vd1 = 23.9 |
| r2 = 20.717 | d2 = 4.50 | nd2 = 1.60311 | vd2 = 60.6 |
| r3 = -3338.388 | d3 = 0.15 | | |
| r4 = 20.138 | d4 = 2.75 | nd3 = 1.69680 | vd3 = 55.5 |
| r5 = 58.612 | d5 = Variable | | |
| r6 = 41.892 | d6 = 0.65 | nd4 = 1.88300 | vd4 = 40.8 |
| r7 = 5.139 | d7 = 2.20 | | |
| r8 = -17.545 | d8 = 0.60 | nd5 = 1.78800 | vd5 = 47.4 |
| r9 = 14.246 | d9 = 0.60 | | |
| r10 = 11.240 | d10 = 1.35 | nd6 = 1.92286 | vd6 = 18.9 |
| r11 = 81.892 | d11 = Variable | | |
| r12* = 9.098 | d12 = 2.80 | nd7 = 1.58313 | vd7 = 59.4 |
| r13* = -119.202 | d13 = 1.10 | | |
| r14 (Stop) = ∞ | d14 = 1.80 | | |
| r15 = 51.286 | d15 = 0.60 | | |
| r16 = 10.954 | d16 = 0.40 | | |
| r17 = 22.560 | d17 = 1.60 | nd8 = 1.77250 | vd8 = 49.6 |
| r18 = -22.895 | d18 = Variable | | |
| r19 = 11.964 | d19 = 2.00 | nd9 = 1.62299 | vd9 = 58.2 |
| r20 = -15.728 | d20 = 0.55 | nd10 = 1.84666 | vd10 = 23.9 |
| r21 = -66.473 | d21 = Variable | | |
| r22 = ∞ | d22 = 2.00 | nd11 = 1.51633 | vd11 = 64.1 |
| r23 = ∞ | d23 = 1.27 | | |
| IP = ∞ | | | |

Aspheric Coefficients

| | | |
|---|---|---|
| r12 | K = 8.19478e-002 | A4 = -9.95768e-005 |
| | A6 = -9.29329e-007 | A8 = 2.23217e-009 |
| r13 | K = -5.58423e+001 | A4 = 1.23446e-004 |

Various Data
Zoom ratio: 14.61

| | Wide-Angle End | Middle Zoom Positions | Telephoto End |
|---|---|---|---|
| Focal Length | 4.67 | 22.04 | 68.20 |
| F-number | 1.85 | 3.00 | 3.50 |
| Angle of View | 29.86 | 6.94 | 2.25 |
| Image Height | 2.68 | 2.68 | 2.68 |
| Total lens length | 61.08 | 61.08 | 61.08 |
| BF | 7.20 | 12.34 | 4.44 |
| d5 | 0.60 | 14.34 | 19.17 |
| d11 | 19.53 | 5.79 | 0.96 |
| d18 | 9.05 | 3.91 | 11.81 |
| d21 | 4.61 | 9.75 | 1.85 |

Zoom Lens Unit Data

| Lens Unit | First Surface | Focal Length |
|---|---|---|
| 1 | 1 | 29.98 |
| 2 | 6 | -5.67 |
| 3 | 12 | 15.52 |
| 4 | 19 | 19.79 |

Numerical Example 5

Surface Data

| | | | |
|---|---|---|---|
| r1 = 46.510 | d1 = 1.15 | nd1 = 1.84666 | vd1 = 23.9 |
| r2 = 23.512 | d2 = 4.85 | nd2 = 1.48749 | vd2 = 70.2 |
| r3 = -135.657 | d3 = 0.15 | | |
| r4 = 20.748 | d4 = 3.05 | nd3 = 1.77250 | vd3 = 49.6 |
| r5 = 60.159 | d5 = Variable | | |
| r6 = 57.389 | d6 = 0.70 | nd4 = 1.88300 | vd4 = 40.8 |

-continued

| | | | |
|---|---|---|---|
| r7 = 5.314 | d7 = 2.45 | | |
| r8 = −22.650 | d8 = 0.60 | nd5 = 1.78800 | vd5 = 47.4 |
| r9 = 12.875 | d9 = 0.60 | | |
| r10 = 10.977 | d10 = 1.40 | nd6 = 1.92286 | vd6 = 18.9 |
| r11 = 76.541 | d11 = Variable | | |
| r12* = 10.578 | d12 = 2.70 | nd7 = 1.54293 | vd7 = 70.5 |
| r13* = −49.750 | d13 = 1.40 | | |
| r14 (Stop) = ∞ | d14 = 2.13 | | |
| r15 = 39.463 | d15 = 0.60 | nd8 = 2.00330 | vd8 = 28.3 |
| r16 = 10.885 | d16 = 0.30 | | |
| r17 = 19.201 | d17 = 1.60 | nd9 = 1.77250 | vd9 = 49.6 |
| r18 = −37.845 | d18 = Variable | | |
| r19 = 14.690 | d19 = 2.00 | nd10 = 1.65160 | vd10 = 58.5 |
| r20 = −10.227 | d20 = 0.55 | nd11 = 1.80809 | vd11 = 22.8 |
| r21 = −21.532 | d21 = Variable | | |
| r22 = ∞ | d22 = 2.50 | nd12 = 1.51633 | vd12 = 64.1 |
| r23 = ∞ | d23 = 2.09 | | |
| IP = ∞ | | | |

Aspheric Coefficients

| | | |
|---|---|---|
| r12 | K = −1.26901e−001 | A4 = 1.93010e−005 |
| | A6 = −1.43378e−007 | A8 = 1.26891e−008 |
| r13 | K = −3.77645e+000 | A4 = 1.74602e−004 |

Various Data
Zoom ratio: 17.05

| | Wide-Angle End | Middle Zoom Positions | Telephoto End |
|---|---|---|---|
| Focal Length | 4.00 | 15.08 | 68.21 |
| F-number | 1.85 | 2.70 | 3.00 |
| Angle of View | 33.83 | 10.08 | 2.25 |
| Image Height | 2.68 | 2.68 | 2.68 |
| Total lens length | 63.39 | 61.33 | 64.37 |
| BF | 8.39 | 12.89 | 5.58 |
| d5 | 0.70 | 13.26 | 21.44 |
| d11 | 20.46 | 5.84 | 0.70 |
| d18 | 7.61 | 3.11 | 10.42 |
| d21 | 4.65 | 9.15 | 1.85 |

Zoom Lens Unit Data

| Lens Unit | First Surface | Focal Length |
|---|---|---|
| 1 | 1 | 31.84 |
| 2 | 6 | −5.86 |
| 3 | 12 | 17.65 |
| 4 | 19 | 15.37 |

Numerical Example 6

Surface Data

| | | | |
|---|---|---|---|
| r1 = 33.284 | d1 = 1.10 | nd1 = 1.84666 | vd1 = 23.9 |
| r2 = 21.289 | d2 = 4.60 | nd2 = 1.48749 | vd2 = 70.2 |
| r3 = −2362.697 | d3 = 0.15 | | |
| r4 = 21.472 | d4 = 2.60 | nd3 = 1.62299 | vd3 = 58.2 |
| r5 = 80.353 | d5 = Variable | | |
| r6 = 80.089 | d6 = 0.70 | nd4 = 1.83481 | vd4 = 42.7 |
| r7 = 5.841 | d7 = 2.90 | | |
| r8 = −35.147 | d8 = 0.60 | nd5 = 1.69680 | vd5 = 55.5 |
| r9 = 10.825 | d9 = 0.60 | | |
| r10 = 9.712 | d10 = 1.40 | nd6 = 1.94595 | vd6 = 18.0 |
| r11 = 23.307 | d11 = Variable | | |
| r12* = 8.079 | d12 = 2.30 | nd7 = 1.48749 | vd7 = 70.2 |
| r13* = −45.307 | d13 = 1.30 | | |
| r14 (Stop) = ∞ | d14 = 2.20 | | |
| r15 = −73.979 | d15 = 0.60 | nd8 = 1.80518 | vd8 = 25.4 |
| r16 = 10.851 | d16 = 0.20 | | |
| r17* = 18.493 | d17* = 1.60 | nd9* = 1.77250 | vd9* = 49.6 |
| r18 = −17.273 | d18 = Variable | | |
| r19 = 13.406 | d19 = 1.75 | nd10 = 1.69680 | vd10 = 55.5 |
| r20 = −31.321 | d20 = 0.55 | nd11 = 1.84666 | vd11 = 23.9 |
| r21 = −177.880 | d21 = Variable | | |
| r22 = ∞ | d22 = 2.00 | nd12 = 1.51633 | vd12 = 64.1 |
| r23 = ∞ | d23 = 1.70 | | |
| IP = ∞ | | | |

Aspheric Coefficients

| | | |
|---|---|---|
| r12 | K = 1.38117e−002 | A4 = −1.66276e−004 |
| | A6 = 9.47481e−007 | A8 = −9.38919e−008 |
| r13 | K = −6.38981e+000 | A4 = 1.94512e−004 |

Various Data
Zoom ratio: 16.21

| | Wide-Angle End | Middle Zoom Positions | Telephoto End |
|---|---|---|---|
| Focal Length | 3.70 | 16.57 | 60.00 |
| F-number | 1.85 | 2.70 | 3.00 |
| Angle of View | 35.09 | 9.19 | 2.56 |
| Image Height | 2.60 | 2.68 | 2.68 |
| Total lens length | 56.82 | 57.99 | 62.22 |
| BF | 7.67 | 12.19 | 5.01 |
| d5 | 0.65 | 13.31 | 21.57 |
| d11 | 20.33 | 4.67 | 0.71 |
| d18 | 3.03 | 2.68 | 9.79 |
| d21 | 4.65 | 9.18 | 1.99 |

Zoom Lens Unit Data

| Lens Unit | First Surface | Focal Length |
|---|---|---|
| 1 | 1 | 33.55 |
| 2 | 6 | −6.08 |
| 3 | 12 | 14.53 |
| 4 | 19 | 19.27 |

Numerical Example 7

Surface Data

| | | | |
|---|---|---|---|
| r1 = 34.284 | d1 = 1.10 | nd1 = 1.84666 | vd1 = 23.9 |
| r2 = 20.765 | d2 = 4.60 | nd2 = 1.48749 | vd2 = 70.2 |
| r3 = −832.849 | d3 = 0.18 | | |
| r4 = 20.562 | d4 = 3.15 | nd3 = 1.69680 | vd3 = 55.5 |
| r5 = 70.585 | d5 = Variable | | |
| r6 = 53.905 | d6 = 0.70 | nd4 = 1.88300 | vd4 = 40.8 |
| r7 = 5.215 | d7 = 2.40 | | |
| r8 = −16.257 | d8 = 0.60 | nd5 = 1.71300 | vd5 = 53.9 |
| r9 = 14.812 | d9 = 0.60 | | |
| r10 = 11.511 | d10 = 1.40 | nd6 = 1.94595 | vd6 = 18.0 |
| r11 = 53.886 | d11 = Variable | | |
| r12* = 11.003 | d12 = 2.90 | nd7 = 1.48749 | vd7 = 70.2 |
| r13* = −23.455 | d13 = 1.30 | | |
| r14 (Stop) = ∞ | d14 = 2.20 | | |
| r15 = 479.434 | d15 = 0.60 | nd8 = 1.80518 | vd8 = 25.4 |
| r16 = 14.443 | d16 = 0.30 | | |
| r17 = 39.539 | d17 = 1.60 | nd9 = 1.69680 | vd9 = 55.5 |
| r18 = −18.726 | d18 = Variable | | |
| r19 = 18.925 | d19 = 1.20 | nd10 = 1.48749 | vd10 = 70.2 |
| r20 = 24.426 | d20 = Variable | | |
| r21 = 14.604 | d21 = 2.00 | nd11 = 1.69680 | vd11 = 55.5 |
| r22 = −12.287 | d22 = 0.55 | nd12 = 1.84666 | vd12 = 23.9 |
| r23 = −36.037 | d23 = Variable | | |
| r24 ∞ | d24 = 3.00 | nd13 = 1.51633 | vd13 = 64.1 |
| r25 ∞ | d25 = 0.78 | | |
| IP = ∞ | | | |

-continued

Aspheric Coefficients

| r12 | K = −1.06924e+000 | A4 = 1.83141e−005 |
| | A6 = 9.64183e−007 | A8 = −1.79063e−008 |
| r13 | K = −1.28413e+000 | A4 = 1.34906e−004 |

Various Data
Zoom ratio: 15.62

| | Wide-Angle End | Middle Zoom Positions | Telephoto End |
|---|---|---|---|
| Focal Length | 4.10 | 15.76 | 64.00 |
| F-number | 1.85 | 2.70 | 3.00 |
| Angle of View | 33.19 | 9.65 | 2.40 |
| Image Height | 2.68 | 2.68 | 2.68 |
| Total lens length | 62.36 | 61.64 | 64.30 |
| BF | 6.02 | 11.56 | 4.60 |
| d5 | 0.70 | 12.89 | 20.08 |
| d11 | 19.80 | 4.83 | 0.71 |
| d18 | 0.89 | 2.96 | 2.55 |
| d20 | 7.57 | 2.03 | 8.98 |
| d23 | 3.26 | 8.80 | 1.85 |

Zoom Lens Unit Data

| Lens Unit | First Surface | Focal Length |
|---|---|---|
| 1 | 1 | 31.23 |
| 2 | 6 | −5.59 |
| 3 | 12 | 16.12 |
| 4 | 19 | 160.87 |
| 5 | 21 | 17.21 |

Numerical Example 8

Surface Data

| r1 = 34.506 | d1 = 1.10 | nd1 = 1.84666 | vd1 = 23.9 |
| r2 = 20.951 | d2 = 4.50 | nd2 = 1.48749 | vd2 = 70.2 |
| r3 = −564.191 | d3 = 0.18 | | |
| r4 = 20.521 | d4 = 3.05 | nd3 = 1.69680 | vd3 = 55.5 |
| r5 = 69.656 | d5 = Variable | | |
| r6 = 55.663 | d6 = 0.70 | nd4 = 1.88300 | vd4 = 40.8 |
| r7 = 5.235 | d7 = 2.40 | | |
| r8 = −15.762 | d8 = 0.60 | nd5 = 1.71300 | vd5 = 53.9 |
| r9 = 14.766 | d9 = 0.60 | | |
| r10 = 11.570 | d10 = 1.40 | nd6 = 1.94595 | vd6 = 18.0 |
| r11 = 55.212 | d11 = Variable | | |
| r12* = 10.149 | d12 = 2.90 | nd7 = 1.48749 | vd7 = 70.2 |
| r13* = −23.214 | d13 = 1.30 | | |
| r14 (Stop) = ∞ | d14 = 2.20 | | |
| r15 = 512.617 | d15 = 0.60 | nd8 = 1.80518 | vd8 = 25.4 |
| r16 = 13.042 | d16 = 0.30 | | |
| r17 = 38.054 | d17 = 1.60 | nd9 = 1.69680 | vd9 = 55.5 |
| r18 = −19.816 | d18 = Variable | | |
| r19 = 20.525 | d19 = 1.20 | nd10 = 1.48749 | vd10 = 70.2 |
| r20 = 37.884 | d20 = Variable | | |
| r21 = 14.513 | d21 = 2.10 | nd11 = 1.69680 | vd11 = 55.5 |
| r22 = −14.530 | d22 = 0.55 | nd12 = 1.84666 | vd12 = 23.9 |
| r23 = −42.350 | d23 = Variable | | |
| r24 = ∞ | d24 = 2.50 | nd13 = 1.51633 | vd13 = 64.1 |
| r25 = ∞ | d24 = 1.22 | | |
| IP = ∞ | | | |

Aspheric Coefficients

| r12 | K = −2.94904e−001 | A4 = −6.73498e−005 |
| | A6 = 5.89193e−007 | A8 = −1.03967e−008 |
| r13 | K = −2.99197e+000 | A4 = 1.15822e−004 |

Various Data
Zoom ratio: 15.61

| | Wide-Angle End | Middle Zoom Positions | Telephoto End |
|---|---|---|---|
| Focal Length | 4.10 | 15.42 | 64.00 |
| F-number | 1.85 | 2.70 | 3.00 |
| Angle of View | 33.18 | 9.86 | 2.40 |
| Image Height | 2.68 | 2.68 | 2.68 |
| Total lens length | 62.35 | 62.34 | 65.33 |
| BF | 5.50 | 11.42 | 4.81 |
| d5 | 0.70 | 12.68 | 19.87 |
| d11 | 20.12 | 5.03 | 0.70 |
| d18 | 1.00 | 4.10 | 4.22 |
| d20 | 7.75 | 1.83 | 8.44 |
| d23 | 2.63 | 8.56 | 1.95 |

Zoom Lens Unit Data

| Lens Unit | First Surface | Focal Length |
|---|---|---|
| 1 | 1 | 31.03 |
| 2 | 6 | −5.53 |
| 3 | 12 | 16.40 |
| 4 | 19 | 89.85 |
| 5 | 21 | 17.58 |

TABLE 1

| | Numerical Example | | | | | | | |
|---|---|---|---|---|---|---|---|---|
| Condition | 1 | 2 | 3 | 4 | 5 | 6 | 7 | 8 |
| (1) | −0.030 | 0.030 | −0.098 | −0.010 | −0.069 | 0.066 | 0.046 | −0.065 |
| (2) | 3.61 | 3.99 | 3.84 | 4.24 | 3.84 | 5.21 | 4.05 | 3.95 |
| (3) | 26.5 | 26.5 | 25.4 | 25.5 | 28.3 | 25.4 | 25.4 | 25.4 |
| (4) | 59.4 | 59.4 | 59.4 | 59.4 | 70.5 | 70.2 | 70.2 | 70.2 |
| (5) | 1.00 | 1.09 | 0.90 | 0.98 | 0.98 | 1.21 | 0.86 | 0.79 |
| (6) | 0.99 | 1.01 | 0.97 | 1.00 | 0.97 | 1.00 | 1.00 | 1.01 |
| (7) | 0.43 | 0.40 | 0.39 | 0.33 | 0.46 | 0.52 | 0.45 | 0.44 |
| (8) | 1.76 | 1.69 | 1.68 | 1.68 | 1.93 | 2.25 | 1.93 | 1.92 |
| (9) | 1.27 | 1.15 | 1.14 | 1.12 | 1.26 | 0.84 | 0.94 | 0.85 |

As described above, each exemplary embodiment can achieve a zoom lens having a high magnification ratio, whose size is compact (small), which can effectively correct various aberrations, such as spherical aberration, coma, curvature of field, axial chromatic aberration, and chromatic aberration of magnification, having a high pixel value, and suitable to an image pickup apparatus, such as a digital camera or a video camera.

An exemplary embodiment of a digital still camera (image pickup apparatus) that uses a zoom lens according to an exemplary embodiment of the present invention as a photographic optical system will now be described below with reference to FIG. 33.

Referring to FIG. 33, the digital camera includes a camera body 20 and a photographic optical system 21. The photographic optical system 21 includes a zoom lens described in any one of the first through the eighth exemplary embodiments.

The digital camera further includes a solid-state image sensor (photoelectrical conversion element) 22, such as a CCD sensor or a CMOS sensor, which is built-in in the camera body 20 and receives an object image formed by the photographic optical system 21. The digital camera further includes a memory 23 configured to record information corresponding to an object image photoelectrically converted by the solid-state image sensor 22.

Furthermore, the digital camera includes a view finder 24 that includes a liquid crystal display panel configured to allow a user to observe an object image formed on the solid-state image sensor 22.

An exemplary embodiment of a video camera (optical apparatus) that uses a zoom lens according to an exemplary embodiment of the present invention as a photographic optical system will now be described below with reference to FIG. 34.

Referring to FIG. 34, the video camera includes a camera body 10 and a photographic optical system 11. The photographic optical system 11 includes a zoom lens described in any one of the first through the eighth exemplary embodiments.

Furthermore, the video camera includes a solid-state image sensor (photoelectric conversion element) 12, such as a CCD sensor or a CMOS sensor. The solid-state image sensor 12 is built-in in the camera body 10 and receives an object image formed by the photographic optical system 11. The video camera further includes a recording unit 13 configured to record information corresponding to an object image photoelectrically converted by the solid-state image sensor 12.

Furthermore, the video camera includes a view finder 14 configured to observe an object image displayed on a display device (not illustrated).

The above-described display device includes a liquid crystal display panel. The object image formed on the image sensor 12 is displayed on the display device.

As described above, an image pickup apparatus whose size is small and having a high optical performance can be implemented by applying a zoom lens according to an exemplary embodiment of the present invention to an image pickup apparatus, such as a digital still camera or a video camera.

According to an exemplary embodiment of the present invention, a zoom lens having a small-sized optical system, whose optical performance may degrade only in a small degree due to a manufacturing error such as a relative offset of the optical axis (relative axial offset) of each lens, and configured to achieve a high image quality during image shake correction (image stabilization) and a camera having the zoom lens can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-340138 filed Dec. 28, 2007, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a rear lens unit including one or more lens units and having an overall positive refractive power,
   wherein intervals between adjacent ones of the first lens unit, the second lens unit, the third lens unit, and the rear lens unit are variable and the second lens unit is movable towards the image side during zooming from a wide-angle end to a telephoto end,
   wherein the third lens unit is movable in a direction having a component perpendicular to an optical axis to displace an image position,
   wherein the third lens unit includes, in order from the object side to the image side, a first subunit having a positive refractive power, an aperture stop, and a second subunit,
   wherein the first subunit includes one lens component having a positive refractive power,
   wherein the second subunit includes a negative lens, and
   wherein a focal length of the first subunit (f3a) and a focal length of the second subunit (f3b) satisfy the following condition:

$-0.1 < f3a/f3b < 0.1$.

2. The zoom lens according to claim 1, wherein a focal length of the rear lens unit at the wide-angle end (fr) and a focal length of the zoom lens at the wide-angle end (fw) satisfy the following condition:

$3.2 < fr/fw < 6.4$.

3. The zoom lens according to claim 1, wherein an Abbe number of a material of the negative lens of the second subunit (vd3bn) satisfy the following condition:

$20 < vd3bn < 33$.

4. The zoom lens according to claim 1, wherein an Abbe number of a material of the lens component having a positive refractive power of the first subunit (vd3ap) satisfy the following condition:

$55 < vd3ap$.

5. The zoom lens according to claim 1, wherein the second subunit further includes a positive lens, and
   wherein the focal length of the first subunit (f3a) and a focal length of the positive lens of the second subunit (f3bp) satisfy the following condition:

$0.7 < f3a/f3bp < 1.3$.

6. The zoom lens according to claim 1, wherein an imaging magnification of the second subunit at the wide-angle end ($\beta 3bw$) and an imaging magnification of the second subunit at the telephoto end ($\beta 3bt$) satisfy the following condition:

$0.8 < \beta 3bt/\beta 3bw < 1.2$.

7. The zoom lens according to claim 1, wherein an interval between the first subunit and the second subunit (dab) and a maximum effective diameter of an aperture of the aperture stop located in the third lens unit at the wide-angle end (Dsp) satisfy the following condition:

$0.1 < dab/Dsp < 1.6$.

8. The zoom lens according to claim 1, wherein a focal length of the first lens unit (f1), a focal length of the zoom lens at the wide-angle end (fw), and a focal length of the zoom lens at the telephoto end (ft) satisfy the following condition:

$1.2 < f1/(fw \cdot ft)^{1/2} < 3.0$.

9. The zoom lens according to claim 1, wherein an imaging magnification of the second lens unit at the wide-angle end ($\beta 2w$) and an imaging magnification of the second lens unit at the telephoto end ($\beta 2t$) satisfy the following condition:

$0.6 < (\beta 2t/\beta 2w)/(ft/fw) < 1.6$.

10. The zoom lens according to claim 1, wherein the lens component having a positive refractive power of the first subunit includes at least one aspheric surface.

11. The zoom lens according to claim 1, wherein the second lens unit includes, in order from the object side to the image side:
 a negative lens having a meniscus shape whose surface on the object side has a convex shape;
 a negative lens whose surface on the image side has a concave shape; and
 a positive lens whose surface on the object side has a convex shape.

12. The zoom lens according to claim 1, wherein the one lens unit constituting the rear lens unit is movable along a locus convex towards the object side during zooming from the wide-angle end to the telephoto end.

13. The zoom lens according to claim 1, wherein the rear lens unit includes a fourth lens unit having a positive refractive power configured to be movable along a locus convex towards the object side during zooming from the wide-angle end to the telephoto end.

14. The zoom lens according to claim 1, wherein the rear lens unit includes, in order from the object side to the image side:
 a fourth lens unit having a positive refractive power; and
 a fifth lens unit having a positive refractive power,
 wherein the fifth lens unit is movable along a locus convex towards the object side during zooming from the wide-angle end to the telephoto end.

15. The zoom lens according to claim 1, wherein the zoom lens is configured to form an image on a solid-state image sensor.

16. An image pickup apparatus comprising:
 a zoom lens; and
 a solid-state image sensor configured to receive an image formed by the zoom lens,
 wherein the zoom lens comprises, in order from an object side to an image side:
  a first lens unit having a positive refractive power;
  a second lens unit having a negative refractive power;
  a third lens unit having a positive refractive power; and
  a rear lens unit including one or more lens units and having an overall positive refractive power,
 wherein intervals between adjacent ones of the first lens unit, the second lens unit, the third lens unit, and the rear lens unit are variable and the second lens unit is movable towards the image side during zooming from a wide-angle end to a telephoto end,
 wherein the third lens unit is movable in a direction having a component perpendicular to an optical axis to displace an image position,
 wherein the third lens unit includes, in order from the object side to the image side, a first subunit having a positive refractive power, an aperture stop, and a second subunit,
 wherein the first subunit includes one lens component having a positive refractive power,
 wherein the second subunit includes a negative lens, and
 wherein a focal length of the first subunit (f3a) and a focal length of the second subunit (f3b) satisfy the following condition:

$-0.1 < f3a/f3b < 0.1$.

* * * * *